US005134051A

United States Patent [19]

Kato et al.

[11] Patent Number: 5,134,051

[45] Date of Patent: Jul. 28, 1992

[54] ELECTROPHOTOGRAPHIC PHOTORECEPTOR

[75] Inventors: Eiichi Kato; Kazuo Ishii, both of Shizuoka, Japan

[73] Assignee: Fuji Photo Film Co., Ltd., Kanagawa, Japan

[21] Appl. No.: 400,853

[22] Filed: Aug. 30, 1989

[30] Foreign Application Priority Data

| | | | |
|---|---|---|---|
| Aug. 31, 1988 | [JP] | Japan | 63-215305 |
| Sep. 5, 1988 | [JP] | Japan | 63-220441 |
| Sep. 6, 1988 | [JP] | Japan | 63-221485 |

[51] Int. Cl.[5] ..................... G03G 5/00; C08F 18/16

[52] U.S. Cl. ..................... 430/96; 526/326

[58] Field of Search ..................... 430/96; 526/326

[56] References Cited

U.S. PATENT DOCUMENTS

| | | | |
|---|---|---|---|
| 3,845,022 | 10/1974 | Ray-Chaudhuri et al. . | |
| 3,885,961 | 5/1975 | Kimura et al. | 430/96 |
| 3,912,506 | 10/1975 | Merrill . | |
| 4,105,448 | 8/1978 | Miyatuka et al. . | |
| 4,500,622 | 2/1985 | Horie et al. | 430/96 |
| 4,621,043 | 11/1986 | Gervay | 430/281 |
| 4,749,981 | 7/1988 | Yui et al. | 338/225 |
| 4,818,654 | 4/1989 | Hiro et al. | 430/59 |
| 4,871,038 | 10/1989 | Kato et al. | 430/96 |
| 4,871,638 | 10/1989 | Kato et al. . | |
| 4,952,475 | 8/1990 | Kato et al. | 430/49 |
| 4,954,407 | 9/1990 | Kato et al. | 430/96 |
| 4,971,871 | 10/1990 | Kato et al. | 430/49 |
| 5,009,975 | 4/1991 | Kato et al. | 430/96 |
| 5,021,311 | 6/1991 | Kato et al. | 430/96 |
| 5,030,534 | 7/1991 | Kato et al. . | |
| 5,084,367 | 1/1992 | Kato et al. . | |

FOREIGN PATENT DOCUMENTS

| | | | |
|---|---|---|---|
| 0768289 | 3/1971 | Belgium | 430/96 |
| 2362753 | 7/1974 | Fed. Rep. of Germany | 430/96 |
| 2537581 | 10/1978 | Fed. Rep. of Germany . | |
| 0217501 | 12/1983 | Japan . | |
| 0038751 | 3/1984 | Japan | 430/96 |
| 1293211 | 12/1986 | Japan | 526/326 |

*Primary Examiner*—Marion E. McCamish
*Assistant Examiner*—S. Crossan
*Attorney, Agent, or Firm*—Sughrue, Mion, Zinn, Macpeak & Seas

[57] ABSTRACT

An electrophotographic photoreceptor comprising a support having provided thereon at least one photoconductive layer containing at least inorganic photoconductive particles and a binder resin is disclosed, wherein said binder resin comprises (A) at least one resin having a weight average molecular weight of from $1\times10^3$ to $2\times10^4$ and comprising not less than 30% by weight of at least one repeating unit (a-i) represented by formula (I) or (II):

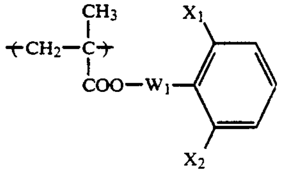

(I)

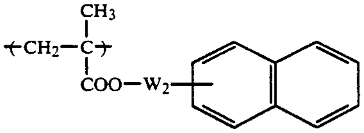

(II)

wherein $X_1$ and $X_2$ each represents a hydrogen atom, a hydrocarbon group having from 1 to 10 carbon atoms, a chlorine atom, a bromine atom, $-COY_1$ or $-COOY_2$, wherein $Y_1$ and $Y_2$ each represents a hydrocarbon group having from 1 to 10 carbon atoms, provided that both $X_1$ and $X_2$ do not simultaneously represent a hydrogen atom; and $W_1$ and $W_2$ each represents a mere bond or a linking group containing from 1 to 4 linking atoms which connects —COO— and the benzene ring, and from 0.5 to 15% by weight of at least one repeating unit (a-ii) containing at least one acidic group selected from $-PO_3H_2$, $-SO_3H$, —COOH,

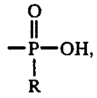

wherein R represents a hydrocarbon group or —OR' (R' represents a hydrocarbon group having from 1 to 22 carbon atoms), and a cyclic acid anhydride-containing group.

12 Claims, No Drawings

ELECTROPHOTOGRAPHIC PHOTORECEPTOR

FIELD OF THE INVENTION

This invention relates to an electrophotographic photoreceptor, and more particularly to an electrophotographic photoreceptor excellent in electrostatic characteristics and moisture resistance, and especially performance properties as a CPC photoreceptor.

BACKGROUND OF THE INVENTION

An electrophotographic photoreceptor may have various structures in agreement with prescribed characteristics or electrophotographic processes applied.

Widely employed among them is a system in which a photoreceptor comprises a support having provided thereon at least one photoconductive layer and, if necessary, an insulating layer on the surface thereof. The photoreceptor composed of a support and at least one photoconductive layer is subjected to ordinary electrophotographic processing for image formation including charging, imagewise exposure, development and, if necessary, transfer.

Electrophotographic photoreceptors have also been used widely as offset printing plate precursor for direct printing plate making. In particular, a direct electrophotographic lithographic printing system has recently been acquiring a greater importance as a system providing hundreds to thousands of prints of high image quality.

Binders to be used in the photoconductive layer should themselves have film-forming properties and capability of dispersing photoconductive particles therein, and, when formulated into a photoconductive layer, binders should exhibit satisfactory adhesion to a support. They are also required to bear various electrostatic characteristics and image-forming properties, such that the photoconductive layer may exhibit excellent electrostatic capacity, small dark decay and large light decay, hardly undergo fatigue before exposure, and stably maintain these characteristics against change of humidity at the time of image formation.

Binder resins which have been conventionally used include silicone resins (see JP-B-34-6670) (the term "JP-B" as used herein refers to an "examined Japanese patent publication"), styrene-butadiene resins (see JP-B-35-1960), alkyd resins, maleic acid resins and polyamides (see JP-B-35-11219), vinyl acetate resins (see JP-B-41-2425), vinyl acetate copolymer resins (see JP-B-41-2426), acrylic resins (see JP-B-35-11216), acrylic ester copolymer resins (see JP-B-35-11219, JP-B-36-8510 and JP-B-41-13946), etc. However, electrophotographic photosensitive materials using these known resins suffer from any of disadvantages, such as poor affinity for photoconductive particles (poor dispersion of a photoconductive coating composition); low charging properties of the photoconductive layer; poor quality of a reproduced image, particularly dot reproducibility or resolving power; susceptibility of reproduced image quality to influences from the environment at the time of electrophotographic image formation, such as a high temperature and high humidity condition or a low temperature and low humidity condition; and the like.

In order to improve electrostatic characteristics of a photoconductive layer, various proposals have hitherto been made. For example, it has been proposed to incorporate into a photoconductive layer a compound containing an aromatic ring or furan ring containing a carboxyl group or nitro group either alone or in combination with a dicarboxylic acid anhydride disclosed in JP-B-42-6878 and JP-B-45-3073. However, the thus improved photosensitive materials are still insufficient with regard to electrostatic characteristics, particularly in light decay characteristics. The insufficient sensitivity of these photosensitive materials has been compensated by incorporating a large quantity of a sensitizing dye into the photoconductive layer. However, photosensitive materials containing a large quantity of a sensitizing dye suffer considerable deterioration of whiteness, which means reduced quality as a recording medium, sometimes causing deterioration of dark decay characteristics, resulting in the failure to obtain a satisfactory reproduced image.

On the other hand, JP-A-60-10254 (the term "JP-A" as used herein refers to a "published unexamined Japanese patent application") suggests to control an average molecular weight of a resin to be used as a binder of the photoconductive layer. According to this suggestion, a combined use of an acrylic resin having an acid value of from 4 to 50 whose average molecular weight is distributed within two ranges, i.e., a range of from $1\times10^3$ to $1\times10^4$ and a range of from $1\times10^4$ and $2\times10^5$, would improve electrostatic characteristics, particularly reproducibility as a PPC photoreceptor on repeated use, moisture resistance and the like.

In the field of lithographic printing plate precursors, extensive studies have been conducted to provide binder resins for a photoconductive layer having electrostatic characteristics compatible with printing characteristics. Examples of binder resins so far reported to be effective for oil desensitization of a photoconductive layer include a resin having a molecular weight of from $1.8\times10^4$ to $10\times10^4$ and a glass transition point of from 10° to 80° C. obtained by copolymerizing a (meth)acrylate monomer and a copolymerizable monomer in the presence of fumaric acid in combination with a copolymer of a (meth)acrylate monomer and a copolymerizable monomer other than fumaric acid disclosed in JP-B-50-31011; a terpolymer containing a (meth)acrylic ester unit having a substituent having a carboxyl group at least 7 atoms distant from the ester linkage disclosed in JP-A-53-54027; a tetra- or pentapolymer containing an acrylic acid unit and a hydroxyethyl (meth)acrylate unit disclosed in JP-A-54-20735 and JP-A-57-202544; a terpolymer containing a (meth)acrylic ester unit having an alkyl group having from 6 to 12 carbon atoms as a substituent and a vinyl monomer containing a carboxyl group disclosed in JP-A-58-68046; and the like.

Nevertheless, actual evaluations of these resins proposed revealed that none of them was satisfactory for practical use in charging properties, dark charge retention, photosensitivity, and surface smoothness of a photoconductive layer.

The binder resins proposed for use in electrophotographic lithographic printing plate precursors were also proved by evaluations to give rise to problems relating to electrostatic characteristics, background staining of prints, and moisture resistance.

Electrophotographic recording systems utilizing a laser beam as a light source have recently been developed. In this system, laser light emitted from a laser and condensed through an $f\theta$ lens is reflected on a polygon mirror to form a scan image on a photoreceptor, and the image is then developed and, if necessary, transferred.

With the recent development of semiconductor lasers of low output, e.g., of from about 5 mW to 25 mW, it has been demanded to develop a photosensitive material having sensitivity in the wavelength region of 700 nm or more. An electrophotographic photoreceptor applicable to the processing using such a low output laser are required to possess special characteristics different from those demanded for the conventional electrophotographic photoreceptors. Particularly important is that the photoreceptor should exhibit sufficient sensitivity to near infrared to infrared light as well satisfactory dark charge retention.

It is known to combine a photoconductive substance-binder resin dispersed system with various kinds of near infrared to infrared spectral sensitizing dyes to form an electrophotographic photoreceptor disclosed, e.g., in JP-A-58-58554, JP-A-58-42055, JP-A-58-59453 and JP-A-57-46245. These photoreceptors, however, have been turned out to be insufficient in dark charge retention and photosensitivity. As stated above, in the case of using a laser, e.g., a semiconductor laser, as a light source, exposure of a photoconductive layer is effected by scanning so that the time of from charging through the end of exposure becomes longer than that required in the conventional exposure to visible light over the entire surface thereof. The charge on the unexposed area should be sufficiently retained over that time. Thus, dark charge retention is one of the extremely important characteristics required for electrophotographic photoreceptors to be used in scanning exposure. The above-described conventional photoreceptors have been unsatisfactory in this point.

Taking the low output of the light source into consideration, sufficiently high sensitivity in the near infrared to infrared region is an important characteristic as well. The conventional photoreceptors are also unsatisfactory in this respect.

SUMMARY OF THE INVENTION

One object of this invention is to provide an electrophotographic photoreceptor having improved electrostatic characteristics, particularly dark charge retention and photosensitivity, and improved image reproducibility.

Another object of this invention is to provide an electrophotographic photoreceptor which can form a clear reproduced image of high quality irrespective of a variation of environmental conditions at the time of reproduction of an image, such as a change to a low temperature and low humidity condition or to a high temperature and high humidity condition.

A still another object of this invention is to provide a CPC electrophotographic photoreceptor having excellent electrostatic characteristics and small dependence on the environment.

A further object of this invention is to provide an electrophotographic photoreceptor which can form a clear reproduced image of high quality even when processed in a scanning exposure system utilizing a semiconductor laser beam.

A still further object of this invention is to provide a lithographic printing plate precursor which provides a lithographic printing plate causing no background stains.

A yet further object of this invention is to provide an electrophotographic photoreceptor which is hardly influenced by the kind of sensitizing dyes used in combination.

It has now been found that the above objects of this invention can be accomplished by an electrophotographic photoreceptor comprising a support having provided thereon at least one photoconductive layer containing at least inorganic photoconductive particles and a binder resin, wherein said binder resin comprises (A) at least one resin having a weight average molecular weight of from $1\times10^3$ to $2\times10^4$ and comprising not less than 30% by weight of (a-i) at least one repeating unit represented by formula (I) or (II):

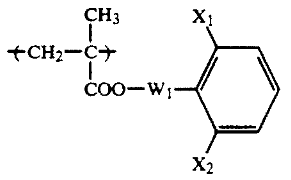
(I)

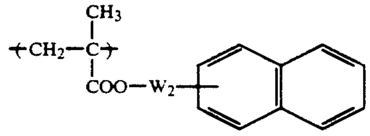
(II)

wherein $X_1$ and $X_2$ each represents a hydrogen atom, a hydrocarbon group having from 1 to 10 carbon atoms, a chlorine atom, a bromine atom, $-COY_1$ or $-COOY_2$, wherein $Y_1$ and $Y_2$ each represents a hydrocarbon group having from 1 to 10 carbon atoms, provided that both $X_1$ and $X_2$ do not simultaneously represent a hydrogen atom; and $W_1$ and $W_2$ each represents a mere bond or a linking group containing from 1 to 4 linking atoms which connects —COO— and the benzene ring, and from 0.5 to 15% by weight of (a-ii) at least one repeating unit containing at least one acidic group selected from $-PO_3H_2$, $-SO_3H$, —COOH,

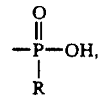

wherein R represents a hydrocarbon group or —OR' (R' represents a hydrocarbon group having from 1 to 10 carbon atoms), and a cyclic acid anhydride-containing group.

It has also been found that film strength of a photoconductive layer can further be improved to provide an electrophotographic photoreceptor exhibiting excellent printing durability by using the above-stated resin (A) which further contains from 1 to 30% by weight of (a-iii) at least one repeating unit containing a heat- and/or photocurable functional group.

It has further been found that improvement of film strength can be enhanced by using, in combination with the low molecular resin (A), (B) at least one high molecular resin having a weight average molecular weight of from $2\times10^4$ to $6\times10^5$.

DETAILED DESCRIPTION OF THE INVENTION

The resin (A) which can be used in the present invention as a binder has a weight average molecular weight of from $1\times10^3$ to $2\times10^4$, preferably from $3\times10^3$ to $1\times10^4$. The resin (A) contains not less than 30% by weight, more preferably from 50 to 97% by weight, of the copolymerization component (a-i) corresponding to the repeating unit represented by formula (I) or (II), from 0.5 to 15% by weight, more preferably from 3 to 10% by weight, of a copolymerization component (a-ii) containing the specific acidic group, and, if desired, preferably from 1 to 30% by weight of the copolymerization component (a-iii) containing a heat- and/or photocurable functional group. The resin (A) preferably has a glass transition point (Tg) of from −10° C. to 100° C., more preferably from −5° C. to 80° C.

If the molecular weight of the resin (A) is less than $1\times10^3$, film-forming properties of the binder reduce, failing to retain sufficient film strength. On the other hand, if it exceeds $2\times10^{-4}$, electrophotographic characteristics, and particularly initial potential and dark decay retention, are deteriorated. Deterioration of electrophotographic characteristics is particularly conspicuous in using such a high molecular weight polymer with the ratio of the acidic group-containing copolymerization component exceeding 3% by weight, resulting in considerable background staining in application as an offset master.

If the proportion of the acidic group-containing copolymerization component in the resin (A) is less than 0.5% by weight, the initial potential is too low to obtain a sufficient image density. If it exceeds 15% by weight, dispersibility reduces, film smoothness and humidity resistance reduce, and background stains increase when the photoreceptor is used as an offset master.

When the resin (A) additionally contains the copolymerization component (a-iii) which contains a heat- and/or photocurable functional group, if the proportion of this copolymerization component is less than 1% by weight, no effect of improving film strength of a photoconductive layer can be produced due to insufficient curing reaction. On the other hand, more than 30% by weight of this component would impair the excellent electrophotographic characteristics brought about by the resin (A), only resulting in the characteristics attainable by using the conventionally known binder resins. In addition, an offset master plate produced from the resulting photoreceptor causes considerable background stains of prints.

The resin (B) which can be used in the present invention has a weight average molecular weight of from $2\times10^4$ to $6\times10^5$. When the resin (B) does not contain, as a copolymerization component, a repeating unit containing the above-specified acidic group (i.e. the repeating unit (a-ii)) or a repeating unit containing a heat- and/or photocurable functional group, it preferably has a weight average molecular weight of from $8\times10^4$ to $6\times10^5$. When the resin (B) contains a repeating unit containing the specific acidic group and/or a repeating unit containing a heat- and/or photocurable functional group, a preferred weight average molecular weight of the resin (B) is from $2\times10^4$ to $1\times10^5$.

If the weight average molecular weight of the resin (B) containing no repeating unit containing the acidic group or curable functional group is less than $8\times10^4$, the effect of improving film strength is insufficient, and the printing durability of an offset master plate produced would be insufficient for obtaining more than 10,000 prints. If it exceeds $6\times10^5$, the resin (B) has reduced solubility in organic solvents and, as a result, a uniform dispersion of a photoconductive substance can hardly be obtained, which would rather lead to reduced film strength.

If the weight average molecular weight of the resin (B) containing an acidic group-containing component or a curable functional group-containing component is less than $2\times10^4$, film strength enough for use as an offset master plate precursor can hardly be obtained. If it exceeds $1\times10^5$, the dispersion of the photoconductive substance tends to form agglomerates or the resulting photoconductive layer tends to become brittle due to too high film hardness, ultimately resulting in reduced film strength. Moreover, the resulting photoreceptor suffers considerable reduction of electrophotographic characteristics, particularly dark decay retention and photosensitivity.

If desired, a crosslinking agent may be used in combination with the binder resin of the present invention. The crosslinking agent is preferably used in an amount of from 1 to 30% by weight, more preferably from 5 to 20% by weight, based on the total binder resin. Use of less than 1% by weight of the crosslinking agent produces no effect of improving film strength. Use of more than 30% by weight of the crosslinking agent results in deterioration of electrophotographic characteristics, such as initial potential, dark decay retention, photosensitivity, and residual potential. Further, an offset master plate produced by using such a large amount of a crosslinking agent causes remarkable background stains.

As described above, the conventionally known acidic group-containing binder resins have been proposed chiefly for use in an offset master plate and, hence, they have a large molecular weight, e.g., more than $5\times10^4$, in order to retain film strength and thereby to improve printing durability.

It was confirmed, to the contrary, that the methacrylate component containing a planar benzene ring or naphthalene ring (i.e., copolymerization component (a-i)) and the acidic group contained in the copolymerization component (a-ii) of the resin (A) are adsorbed onto stoichiometrical defects of an inorganic photoconductive substance to sufficiently cover the surface thereof, whereby electron traps of the photoconductive substance can be compensated for and humidity resistance can be greatly improved, while assisting the photoconductive particles to be sufficiently dispersed without agglomeration. The fact that the resin (A) has a low molecular weight also functions to improve covering power for the surface of the photoconductive particles.

The photoconductive layer obtained by the present invention has improved surface smoothness. If a photoreceptor to be used as a lithographic printing plate precursor is prepared from a nonuniform dispersion of photoconductive particles in a binder resin with agglomerates being present, the photoconductive layer would have a rough surface. As a result, nonimage areas cannot be rendered uniformly hydrophilic by oil desensitization treatment with an oil desensitizing solution. Such being the case, the resulting printing plate induces adhesion of a printing ink to the nonimage areas on printing, which phenomenon leads to background stains of the nonimage areas of prints.

Thus, the low molecular weight resin (A) of the present invention is sufficiently adsorbed onto the photoconductive particles to cover the surface of the particles to thereby provide smoothness of the photoconductive layer, satisfactory electrostatic characteristics, and stain-free images. The film strength of the resulting photoreceptor suffices for use as a CPC photoreceptor or as an offset printing plate precursor for production of an offset printing plate to be used for obtaining around a thousand prints under limited printing conditions, such as printing by means of a desk-top (small-sized) printer.

In addition, it was revealed that mechanical strength of the photoconductive layer achieved by the use of the resin (A) can be further improved by various embodiments. That is, improvement of film strength can be achieved by (1) an embodiment in which the resin (A) further contains a curable functional group and such a curable resin (A) is combined with the resin (B) containing a curable functional group and/or a crosslinking agent to thereby induce crosslinking among the resin (A) or between the resins (A) and (B); (2) an embodiment in which the resin (A) containing no curable functional group is combined with the resin (B) containing a curable functional group whereby the entanglement of the long high molecular chains of the resin (B) per se is taken advantage of; (3) an embodiment in which the resin (A) is combined with the resin (B) containing a small proportion of a specific acidic group thereby to make the resin (B) to exert a weak mutual action onto the inorganic photoconductive particles; (4) an embodiment in which the resin (A) is combined with the resin (B) containing a curable functional group and a crosslinking agent to induce crosslinking reaction among the molecules of the resin (B); and (5) an embodiment in which the resin (A) is combined with the resin (B) containing both an acidic group and a curable functional group to thereby produce the above-described two effects.

Improved mechanical strength of the photoconductive layer as obtained in these preferred embodiments leads to not only improved performance properties for use as a CPC photoreceptor, such as abrasion resistance, writability, and filing properties (strength can be retained on filing) but also improved performance properties for use as an offset master plate precursor, such as printing durability amounting to 6,000 to 10,000 prints irrespective of variations of printing conditions (e.g., use of a large-sized printing machine or an increased printing pressure). In other words, these preferred embodiments provide improvement on mechanical strength of the photoconductive layer which might be insufficient in using the resin (A) alone depending on end use, without impairing the functions of the resin (A) at all.

The electrophotographic photoreceptor according to the present invention thus exhibits excellent electrostatic characteristics irrespective of changes of environmental conditions as well as sufficient film strength, thereby making it possible to provide an offset master plate having printing durability of more than 10,000 prints. Further, the excellent electrostatic characteristics can be stably manifested irrespective of the environmental conditions even when processed according to a scanning exposure system utilizing a semiconductor laser beam.

The repeating unit (a-i) which constitutes at least 30% by weight of the resin (A) can be represented by formula (I) or (II).

In formula (I), $X_1$ and $X_2$ each preferably represents a hydrogen atom, a chlorine atom, a bromine atom, an alkyl group having from 1 to 4 carbon atoms (e.g., methyl, ethyl, propyl, butyl), an aralkyl group having from 7 to 9 carbon atoms (e.g., benzyl, phenethyl, 3-phenylpropyl, chlorobenzyl, dichlorobenzyl, bromobenzyl, methylbenzyl, methoxybenzyl, chloromethylbenzyl), an aryl group (e.g., phenyl, tolyl, xylyl, bromophenyl, methoxyphenyl, chlorophenyl, dichlorophenyl), or $-COY_1$ or $-COOY_2$, wherein $Y_1$ and $Y_2$ each preferably represents any of the above-recited hydrocarbon groups, provided that $X_1$ and $X_2$ do not simultaneously represent a hydrogen atom.

In formula (I), $W_1$ is a mere bond or a linking group containing 1 to 4 linking atoms which connects $-COO-$ and the benzene ring, e.g., $-(CH_2)_n-$ (n: 1, 2 or 3), $-CH_2CH_2OCO-$, $-(CH_2)_m-$ (m: 1 or 2), and $-CH_2CH_2O-$.

In formula (II), $W_2$ has the same meaning as $W_1$.

Specific examples of the repeating unit (a-i) represented by formula (I) or (II) are shown below, for illustrative purposes only but not for limitation.

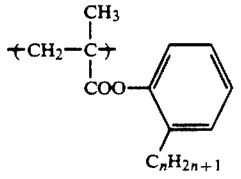

a-1)

n: an integer of 1 to 4 (hereinafter the same)

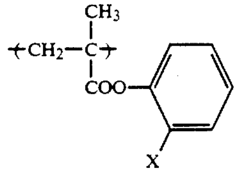

a-2)

X: —Cl, —Br or —I (hereinafter the same)

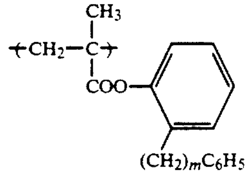

a-3)

m: 0 or an integer of 1 to 3 (hereinafter the same)

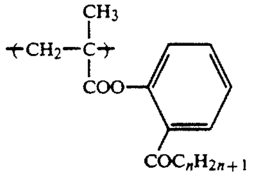

a-4)

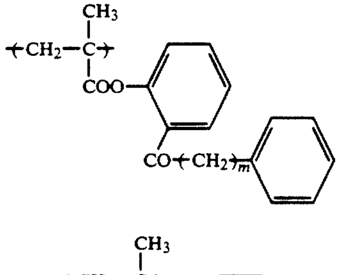

a-5)

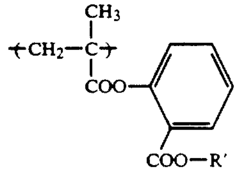

a-6)

R′: $-C_nH_{2n+1}$ or $(CH_2)_mC_6H_5$

-continued
a-7)
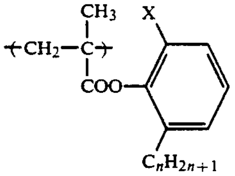
a-8)
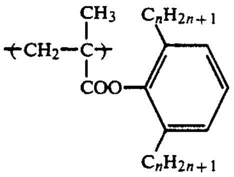
a-9)
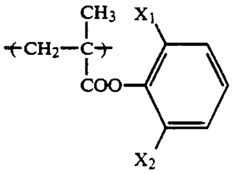
$X_1$, $X_2$ (the same or different):X
a-10)
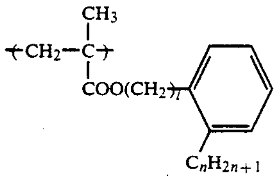
l: an integer of 1 to 3
a-11)
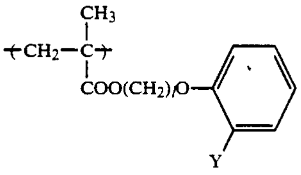
Y: H or —X
a-12)
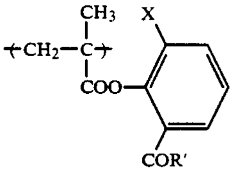
a-13)
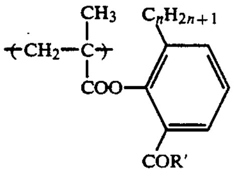
a-14)
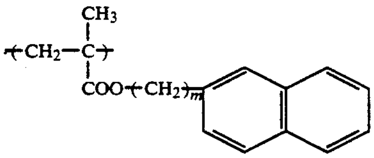
-continued
a-15)
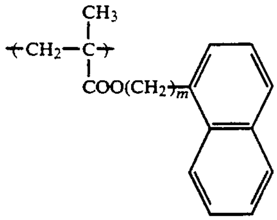
a-16)
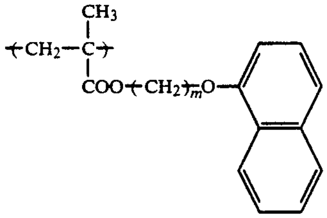
a-17)
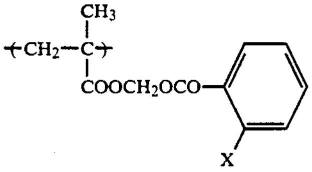
a-18)
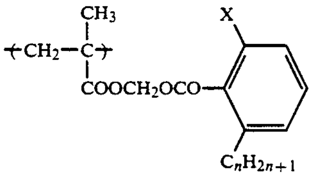
a-19)
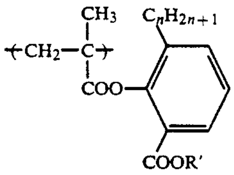
a-20)
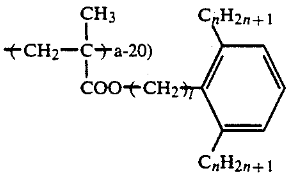
The acidic group in the resin (A) includes $—PO_3H_2$, $—SO_3H$, —COOH,
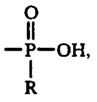
and a cyclic acid anhydride-containing group.
In the group
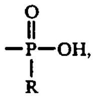
R represents a hydrocarbon group or —OR', wherein R' represents a hydrocarbon group. The hydrocarbon group as represented by R or R' preferably includes an aliphatic group having from 1 to 22 carbon atoms (e.g., methyl, ethyl, propyl, butyl, hexyl, octyl, decyl, dodecyl, octadecyl, 2-chloroethyl, 2-methoxyethyl, 3-ethoxypropyl, allyl, crotonyl, butenyl, cyclohexyl, benzyl, phenethyl, 3-phenylpropyl, methylbenzyl, chlorobenzyl, fluorobenzyl, methoxybenzyl) and a substituted or unsubstituted aryl group (e.g., phenyl, tolyl, ethylphenyl, propylphenyl, chlorophenyl, fluorophenyl, bromophenyl, chloromethylphenyl, dichlorophenyl, methoxyphenyl, cyanophenyl, acetamidophenyl, acetylphenyl, butoxyphenyl). R and R′ more preferably represents an alkyl group having from 1 to 4 carbon atoms, an aralkyl group, an aralkyl group having a substituent containing up to 4 carbon atoms, an aryl group, or an aryl group having a substituent containing up to 4 carbon atoms.

The cyclic acid anhydride-containing group is a group containing at least one cyclic acid anhydride. The cyclic acid anhydride to be contained includes aliphatic dicarboxylic acid anhydrides and aromatic dicarboxylic acid anhydrides.

Specific examples of the aliphatic dicarboxylic acid anhydrides include succinic anhydride ring, glutaconic anhydride ring, maleic anhydride ring, cyclopentane-1,2-dicarboxylic acid anhydride ring, cyclohexane-1,2-dicarboxylic acid anhydride ring, cyclohexene-1,2-dicarboxylic acid anhydride ring, 2,3-bicyclo[2,2,2]-octanedicarboxylic acid anhydride. These rings may be substituted with, for example, a halogen atom (e.g., chlorine, bromine) and an alkyl group (e.g., methyl, ethyl, butyl, hexyl).

Specific examples of the aromatic dicarboxylic acid anhydrides are phthalic anhydride ring, naphthalenedicarboxylic acid anhydride ring, pyridinedicarboxylic acid anhydride ring, and thiophenedicarboxylic acid anhydride ring. These rings may be substituted with, for example, a halogen atom (e.g., chlorine, bromine), an alkyl group (e.g., methyl, ethyl, propyl, butyl), a hydroxyl group, a cyano group, a nitro group, and an alkoxycarbonyl group (e.g., methoxycarbonyl, ethoxycarbonyl).

The copolymerization component corresponding to the repeating unit (a-ii) may be any of vinyl compounds copolymerizable with a methacrylate monomer corresponding to the repeating unit (a-i) and containing the specific acidic group. Examples of such vinyl compounds are described, e.g., in Kobunshi Gakkai (ed.), *Kobunshi Data Handbook (Kisohen)*, Baifukan (1986). Specific examples of these vinyl monomers are acrylic acid, α- and/or β-substituted acrylic acids (e.g., α-acetoxy, α-acetoxymethyl, α-(2-amino)methyl, α-chloro, α-bromo, α-fluoro, α-tributylsilyl, α-cyano, β-chloro, β-bromo, α-chloro-β-methoxy, α,β-dichloro compounds), methacrylic acid, itaconic acid, itaconic half esters, itaconic half amides, crotonic acid, 2-alkenylcarboxylic acids (e.g., 2-pentenoic acid, 2-methyl-2-hexenoic acid, 2-octenoic acid, 4-methyl-2-hexenoic acid, 4-ethyl-2-octenoic acid), maleic acid, maleic half esters, maleic half amides, vinylbenzenecarboxylic acid, vinylbenzenesulfonic acid, vinylsulfonic acid, vinylphosphonic acid, dicarboxylic acid vinyl or allyl half esters, and ester or amide derivatives of these carboxylic acids or sulfonic acids containing the polar group in the substituent thereof.

Specific examples of the repeating unit (a-ii) are shown below for illustrative purposes only but not for limitation.

b-1)

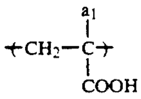

$a_1$: $-H$, $-CH_3$, $-CH_2COOH$, $-CH_2COOCH_3$ or $-Cl$ b-2)

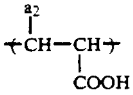

$a_2$: $-CH_3$ or $-COOH$ b-3)

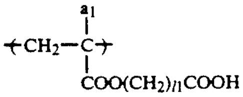

l1: an integer of 2 to 12 (hereinafter the same)

b-4)

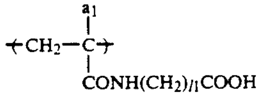

b-5)

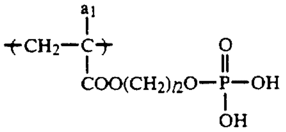

b-6)

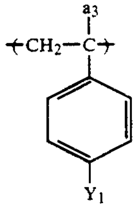

$a_3$: $-H$ or $-CH_3$

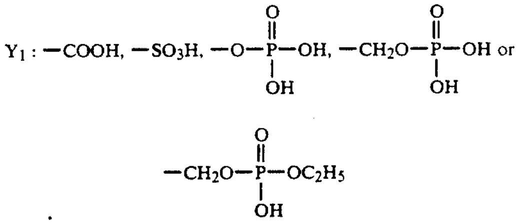

b-7)

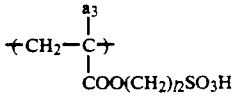

l2: an integer of 2 to 4 b-8)

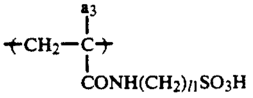

b-9)

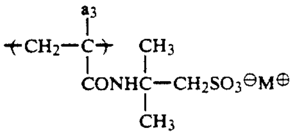

-continued

M⊕: $HN^{\oplus}(C_2H_5)_3$ or 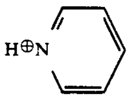

b-10)

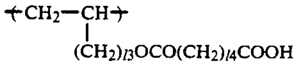

13: an integer of 1 to 3

14: an integer of 2 to 3 b-11)

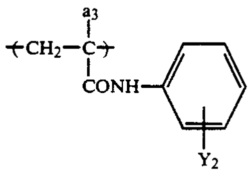

$Y_2$: —COOH or —$SO_3H$ b-12)

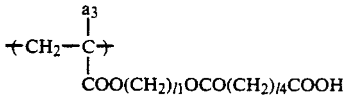

b-13)

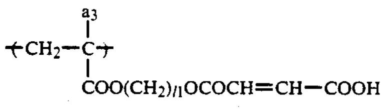

b-14)

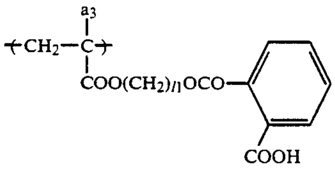

b-15)

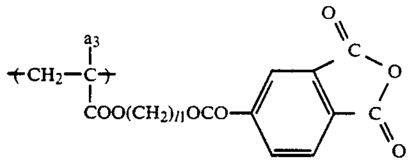

b-16)

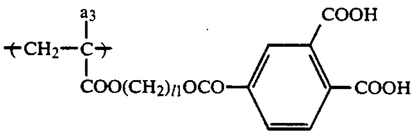

b-17)

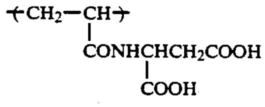

b-18)

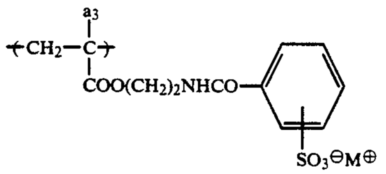

b-19)

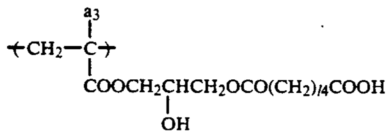

-continued b-20)

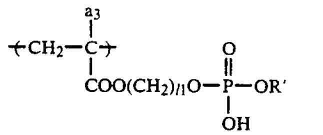

R': —$C_nH_{2n+1}$ (n = an integer of 1 to 4)

b-21)

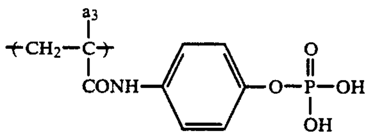

b-22)

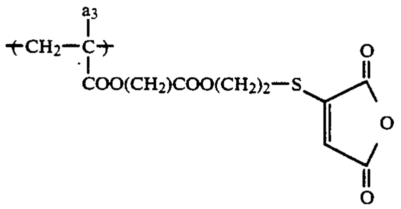

In the repeating unit (a-iii) which may constitute the resin (A), if desired, the term "heat- and/or photocurable functional group" means a functional group capable of inducing curing reaction of a resin on application of heat and/or light.

Specific examples of the photocurable functional group are those used in conventional photosensitive resins known as photocurable resins as described in Hideo Inui and Gentaro Nagamatsu, *Kankosei Kobunshi,* Kodansha (1977), Takahiro Tsunoda, *Shin-Kankosei Jushi,* Insatsu Gakkai Shuppanbu (1981), Kiyomi Kato, *Shigaisen Koka System,* Chapters 5 to 7, Sogo Gijutsu Center (1989), G. E. Green and B. P. Starch, *J. Macro. Sci. Reas. Macro Chem.,* C 21 (2), pp. 187 to 273 (1981-82), and C. G. Rattey, *Photopolymerization of Surface Coatings,* A Wiley Interscience Pub. (1982).

The heat-curable functional group includes functional groups excluding the above-specified acidic groups. Examples of the heat-curable functional groups are described, e.g., in Tsuyoshi Endo, *Netsukokasei Kobunshi no Seimitsuka,* C.M.C. (1986), Yuji Hara, *Saishin Binder Gijutsu Binran,* Chapter II-I, Sogo Gijutsu Center (1985), Takayuki Ohtsu, *Acryl Jushi no Gosei Sekkei to Shin-Yotokaihatsu,* Chubu Kei-ei Kaihatsu Center Shuppanbu (1985), and Eizo Ohmori, *Kinosei Acryl Jushi,* Techno System (1985).

Specific examples of the heat-curable functional group are —OH, —SH—, —$NH_2$— —$NHR_1$ (wherein $R_1$ represents a hydrocarbon group, such as a substituted or unsubstituted alkyl group having from 1 to 10 carbon atoms (e.g., methyl, ethyl, propyl, butyl, hexyl, octyl, decyl, 2-chloroethyl, 2-methoxyethyl, 2-cyanoethyl), a substituted or unsubstituted cycloalkyl group having from 4 to 8 carbon atoms (e.g., cycloheptyl, cyclohexyl), a substituted or unsubstituted aralkyl group having from 7 to 12 carbon atoms (e.g., benzyl, phenethyl, 3-phenylpropyl, chlorobenzyl, methylbenzyl, methoxybenzyl , and a substituted or unsubstituted aryl group (e.g., phenyl, tolyl, silyl, chlorophenyl, bromophenyl, methoxybenzyl, naphthyl)),

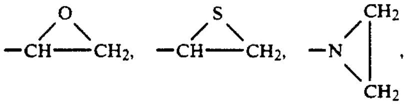

—$CONHCH_2OR_2$ (wherein $R_2$ represents a hydrogen atom or an alkyl group having from 1 to 8 carbon atoms (e.g., methyl, ethyl, propyl, butyl, hexyl, octyl)), —N=C=O, and

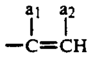

(wherein $a_1$ and $a_2$ each represents a hydrogen atom, a halogen atom (e.g., chlorine, bromine) or an alkyl group having from 1 to 4 carbon atoms (e.g., methyl, ethyl)).

Another examples of the heat- and/or photocurable functional group include polymerizable double bond groups such as $CH_2=CH—$, $CH_2=CH—CH_2—$,

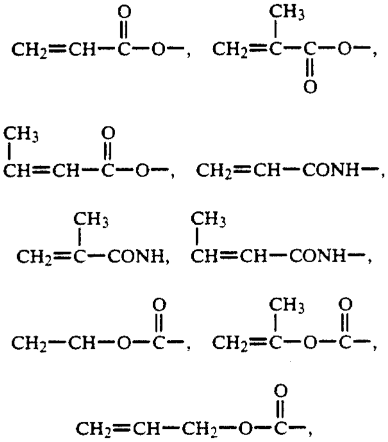

$CH_2=CH—NHCO—$, $CH_2=CH=CH_2—NHCO$, $CH_2=CH—SO_2—$, $CH_2=CH—CO—$, $CH_2=CH—O—$, and $CH_2=CH—S—$.

The resin (A) containing the curable functional group can be obtained by a method comprising introducing the functional group into a polymer by high molecular reaction or a method comprising copolymerizing at least one monomer containing at least one of the functional groups, a monomer corresponding to the repeating unit of formula (I) or (II), and a monomer corresponding to the acidic group-containing repeating unit.

The above-described high molecular reaction can be carried out by known low molecular synthesis reactions. For the details, reference can be made to it, e.g., in Nippon Kagakukai (ed.), *Shin-Jikken Kagaku Koza*, Vol. 14, "Yuki Kagobutsu no Gosei to Hanno" (I)-[v], Maruzen K. K. and Yoshio Iwakura and Keisuke Kurita, *Hannosei Kobunshi*.

Examples of the monomers containing the functional group capable of inducing heat- and/or photocurable reaction include vinyl compounds copolymerizable with the monomers corresponding to the repeating unit of formula (I) or (II) and containing the above-described functional group. More specifically, the compounds above enumerated as acidic group-containing compounds and further containing the above-described functional group in their substituent.

Specific examples of the heat- and/or photocurable functional group-containing repeating unit (a-iii) are shown below.

c-1)

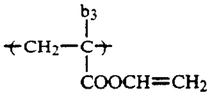

$b_3$: $—H$ or $—CH_3$ (hereinafter the same)

c-2)

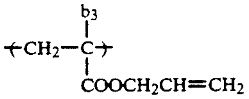

c-3)

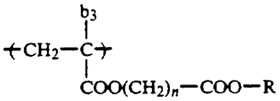

R: $—CH=CH_2$ or $—CH_2CH=CH_2$ n: an integer of 1 to 11 c-4)

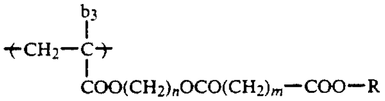

R: $—CH=CH_2$ or $—CH_2CH=CH_2$ n, m: an integer of 1 to 11 c-5)

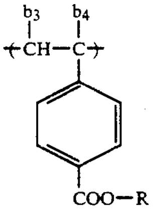

R: $—CH=CH_2$ or $—CH_2CH=CH_2$ $b_4$: H or $CH_3$ (hereinafter the same)

c-6)

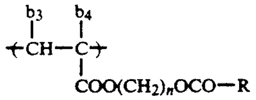

R:

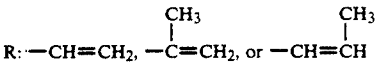

n: an integer of 1 to 11 c-7)

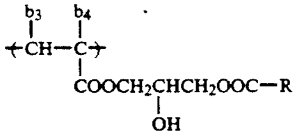

R:

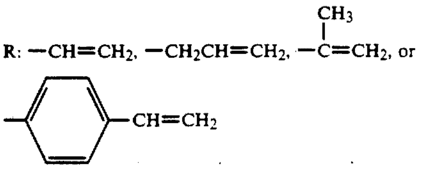

-continued c-8)

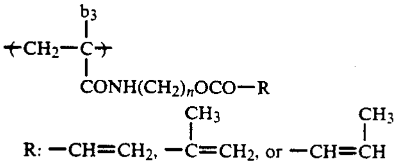

n: an integer of 1 to 10 c-9)

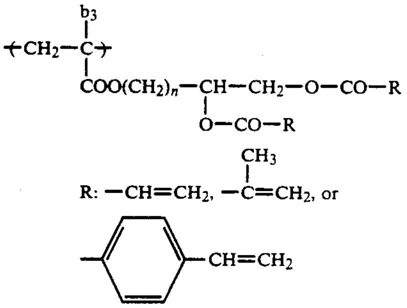

n: an integer of 1 to 4 c-10)

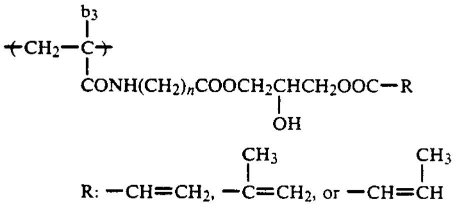

n: an integer of 1 to 11 c-11)

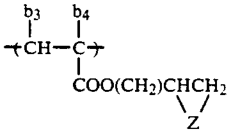

n: an integer of 1 to 4

Z: —S— or —O— c-12)

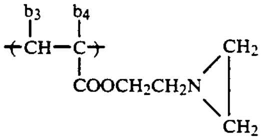

c-13)

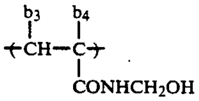

c-14)

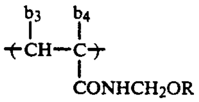

R: $C_1 = C_4$ alkyl c-15)

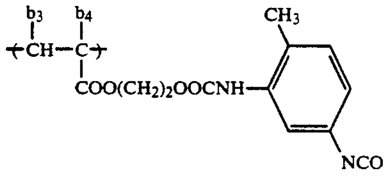

-continued c-16)

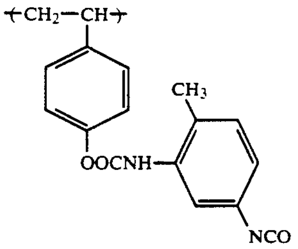

c-17)

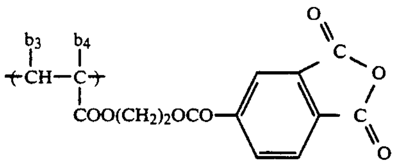

c-18)

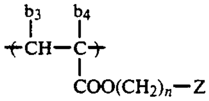

Z: $—OH$ or $—NH_2$ n: an integer of 2 to 11 c-19)

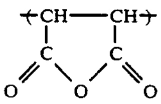

c-20)

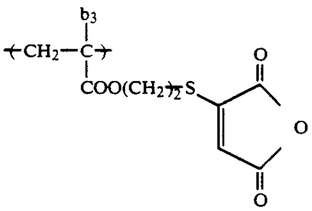

c-21)

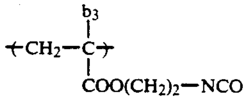

c-22)

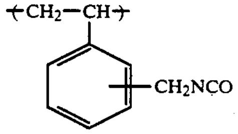

The resin (A) may further comprise other copolymerizable monomers in addition to the monomer corresponding to the repeating unit of formula (I) or (II), the acidic group-containing monomer, and, if desired, the heat- and/or photocurable functional group-containing monomer. Examples of such monomers include α-olefins, vinyl alkanoates, allyl alkanoates, acrylonitrile, methacrylonitrile, vinyl ethers, acrylic esters, methacrylic esters, acrylamides, methacrylamides, styrenes, and heterocyclic vinyl compounds (e.g., vinylpyrrolidone, vinylpyridine, vinylimidazole, vinylthiophene, vinylimidazoline, vinylpyrazoles, vinyldioxane, vinylquinoline, vinylthiazole, vinyloxazine).

Any of the binder resins conventionally employed in electrophotographic photoreceptors can be used as the resin (B). The resin (B) may be used either individually or in combination of two or more thereof. Specific examples of usable resins (B) are described in Harumi Miyahara and Hidehiko Takei, *Imaging*, Vol. 1978, No. 8, pp. 9 to 12, and Takaharu Kurita and Jiro Ishiwatari, *Kobunshi*, Vol. 17, pp. 278 to 284 (1968).

Specific examples of the resin (B) include olefin polymers and copolymers, vinyl chloride copolymers, vinylidene chloride copolymers, vinyl alkanoate polymers and copolymers, allyl alkanoate polymers and copolymers, polymers and copolymers of styrene derivatives or derivatives thereof, butadiene-styrene copolymers, isoprene-styrene copolymers, butadiene-unsaturated carboxylic acid ester copolymers, acrylonitrile copolymers, methacrylonitrile copolymers, alkyl vinyl ether copolymers, acrylic ester polymers or copolymers, methacrylic ester polymers or copolymers, styrene-acrylic ester copolymers, styrene-methacrylic ester copolymers, itaconic diester polymers or copolymers, maleic anhydride copolymers, acrylamide copolymers, methacrylamide copolymers, hydroxyl-modified silicone resins, polycarbonate resins, ketone resins, amide resins, hydroxyl- and carboxyl-modified polyester resins, butyral resins, polyvinylacetal resins, cyclized rubber-methacrylic ester copolymers, cyclized rubber-acrylic ester copolymers, copolymers containing a heterocyclic ring containing no nitrogen atom (the heterocyclic ring includes furan, tetrahydrofuran, thiophene, dioxane, dioxolane, lactone, benzofuran, benzothiophene, and 1,3-dioxetane rings), and epoxy resins.

The resin (B) preferably includes polymers or copolymers containing not less than 30% by weight of a (meth)acrylic ester unit represented by formula (III):

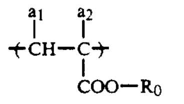
(III)

wherein $a_1$ and $a_2$, which may be the same or different, each represents a hydrogen atom, a halogen atom (chlorine, bromine), a cyano group, or an alkyl group having from 1 to 4 carbon atoms; and $R_0$ represents a substituted or unsubstituted alkyl group having from 1 to 18 carbon atoms (e.g., methyl, ethyl, propyl, butyl, pentyl, hexyl, octyl, decyl, dodecyl, tridecyl, tetradecyl, 2-methoxyethyl, 2-ethoxyethyl), a substituted or unsubstituted alkenyl group having from 2 to 18 carbon atoms (e.g., vinyl, allyl, isopropenyl, butenyl, hexenyl, heptenyl, octenyl), a substituted or unsubstituted aralkyl group having from 7 to 12 carbon atoms (e g., benzyl, phenethyl, methoxybenzyl, ethoxybenzyl, methylbenzyl), a substituted or unsubstituted cycloalkyl group having from 5 to 8 carbon atoms (e.g., cyclopentyl, cyclohexyl, cycloheptyl), and an aryl group (e.g., phenyl, tolyl, xylyl, mesityl, naphthyl, methoxyphenyl, ethoxyphenyl, chlorophenyl, dichlorophenyl, bromophenyl, chloromethylphenyl, bromochlorophenyl, butylphenyl, methoxycarbonylphenyl, phenoxyphenyl, cyanophenyl).

The above-described preferred resin (B) is particularly advantageous in that an offset master plate produced from the resulting photoreceptor does not cause background stains on printing.

In formula (III), $a_1$ and $a_2$ each preferably represents a hydrogen atom or a methyl group.

In cases where $a_1$ and $a_2$ both represent a hydrogen atom, and $R_0$ represents an alkyl group having from 6 to 18 carbon atoms, the proportion of such a component in the resin (B) is preferably not more than 60% by weight.

In a preferred embodiment, the resin (B) is a random copolymer containing from 0.05 to 5% by weight of a copolymerization component containing the above-specified acidic group in addition to the polymerization component (b-i) of formula (III).

The polymerization component containing the specific acidic group may be any of compounds copolymerizable with the monomer corresponding to the polymerization component of formula (III). Examples of usable compounds are those recited with respect to the component (a-ii) of the resin (A).

What is important in this embodiment is that the above-described resin (B) containing the acidic group has a weight average molecular weight of not more than $1\times10^5$. It is particularly preferable that the acidic group-containing component in the resin (B) ranges from 1 to 60% by weight of the acidic group-containing component in the resin (A).

In another preferred embodiment of the present invention, the resin (B) is a copolymer containing from 1 to 30% by weight of at least one component containing the heat- and/or photocurable functional group in addition to the copolymerization component (b-i) of formula (III). The heat- and/or photocurable functional group as herein referred to includes those recited with respect to the repeating unit (a-iii) of the resin (A).

Other monomers which are copolymerizable with the monomer corresponding to the repeating unit represented by formula (III) include α-olefins, vinyl alkanoates, allyl alkanoates, acrylonitrile, methacrylonitrile, vinyl ethers, acrylamides, methacrylamides, styrenes (e.g., styrene, vinyltoluene, vinylnaphthalene, butylstyrene, methoxystyrene, chlorostyrene, dichlorostyrene, bromostyrene), heterocyclic vinyl compounds (e.g., vinylpyrrolidone, pyridine, vinylimidazole, vinylthiophene, vinylimidazoline, vinylpyrazole, vinyldioxane, vinylquinoline, vinylthiazole, vinyloxazine); compounds described in Kobunshi Gakkai (ed.), *Kobunshi Data Handbook (Kisohen)*, pp. 175 to 181, D. A. Tomalia, *Reactive Heterocyclic Monomers*, Chapter 1 of "Functional Monomers Vol. 2", Marcel DeRRer Inc., N.Y. (1974), and L. S. LusRin, *Basic Monomers*, Chapter 3 of "Functional Monomers Vol. 2", Marcel DeRRer Inc., N.Y. (1974); and compounds of formula (III) wherein $R_0$ is displaced with any of other substituents, such as an alkyl group having from 1 to 6 carbon atoms substituted with a halogen atom (e.g., fluorine, chlorine, bromine, iodine), a hydroxyl group, a cyano group, an amino group, a heterocyclic group, a silyl group, $-CONH_2$, etc. (e.g., 2-chloroethyl, 2-bromoethyl, 2,2,2-trifluoroethyl, 2,3-dibromopropyl, 2-hydroxyethyl, 3-hydroxypropyl, 2,3-dihydroxypropyl, 3-chloro-2-hydroxypropyl, 2-cyanoethyl, 3-(trimethoxysilyl)propyl, 2-furylethyl, 2-thienylethyl, 2-(N-morpholino)ethyl, 2-amidoethyl, 2-methylsulfonylethyl, 2-(N,N-dimethylamino)ethyl, 2-(N,N-diethylamino)ethyl).

Other copolymerization components which may constitute the resin (B) are not limited to the foregoing monomers. It is preferable that the proportion of each of these copolymerization components should not exceed 30% by weight, more preferably 20% by weight, of the resin (B).

In the present invention two or more of the resin (B) may be used with the resin (A).

In the present invention, particularly when the binder resin contains a heat- and/or photocurable functional group, it is preferable to use a reaction accelerator for accelerating crosslinking reaction in the photoconductive layer.

In the case where crosslinking reaction is effected through formation of a chemical bond between functional groups, the reaction accelerator to be used includes organic acid type crosslinking agents (e.g., acetic acid, propionic acid, butyric acid, benzenesulfonic acid, p-toluenesulfonic acid). Compounds described in Shinzo Yamashita and Tosuke Kaneko (ed.), Kakyozai Handbook, Taiseisha (1981) can also be used as a crosslinking agent. For example, generally employed crosslinking agents such as organosilanes, polyurethanes and polyisocyanates, and curing agents such as epoxy resins and melamine resins can be used.

In the case where crosslinking reaction is effected through polymerization reaction, reaction accelerators to be used include polymerization initiators (such as peroxides and azobis compounds, preferably azobis type polymerization initiators) and polyfunctional polymerizable group-containing monomers (e.g., vinyl methacrylate, allyl methacrylate, ethylene glycol diacrylate, polyethylene glycol diacrylate, divinylsuccinic succinic esters, divinyladipic esters, diallylsuccinic esters, 2-methylvinyl methacrylate, divinylbenzene).

In the case where the bind resin contains a photo-crosslinkable functional group, a sensitizer, a photopolymerizable monomers, and the like may be added. More specifically, compounds described in the literature cited above with respect to the photosensitive resins can be used.

When the binder resin contains a heat-curable functional group, the photoconductive substance-binder resin dispersed system is subjected to heat-curing treatment. The heat-curing treatment can be carried out by drying the photoconductive coating under conditions more severe than those generally employed for the preparation of conventional photoreceptors. For example, the heat-curing can be achieved by drying the coating at a temperature of from 60° to 120° C. for 5 to 120 minutes. When the binder resin contains a photocrosslinkable functional group, the coating is subjected to photocuring treatment by application of electron rays, X-rays, ultraviolet rays or plasma rays.

The above-described crosslinking accelerator is preferably used in an amount of from 0.5 to 15% by weight based on the total binder resin.

The ratio of the resin (A) to the resin (B) varies depending on the kind, particle size, and surface conditions of the inorganic photoconductive material used. In general, the weight ratio of the resin (A) to the resin (B) is 5 to 80:95 to 20, preferably 10 to 60:90 to 40.

The inorganic photoconductive material which can be used in the present invention includes zinc oxide, titanium oxide, zinc sulfide, cadmium sulfide, cadmium carbonate, zinc selenide, cadmium selenide, tellurium selenide, and lead sulfide.

The resin binder is used in a total amount of from 10 to 100 parts by weight, preferably from 15 to 50 parts by weight, per 100 parts by weight of the inorganic photoconductive material.

If desired, the photoconductive layer according to the present invention may contain various spectral sensitizers. Examples of the spectral sensitizers are carbonium dyes, diphenylmethane dyes, triphenylmethane dyes, xanthene dyes, phthalein dyes, polymethine dyes (e.g., oxonol dyes, merocyanine dyes, cyanine dyes, rhodacyanine dyes, styryl dyes), phthalocyanine dyes (inclusive of metallized dyes), and the like. Reference can be made to it in Harumi Miyamoto and Hidehiko Takei, *Imaging*, Vol. 1973, No. 8, p. 12, C. J. Young, et al., *RCA Review*, Vol. 15, p. 469 (1954), Kohei Kiyota, et al., *Denkitsushin Gakkai Ronbunshi, J* 63-*C*, No. 2, p. 97 (1980), Yuji Harasaki, et al., *Kogyo Kagaku Zasshi*, Vol. 66, p. 78 and 188 (1963), and Tadaaki Tani, *Nihon Shashin Gakkaishi*, Vol. 35, p. 208 (1972).

Specific examples of the carbonium dyes, triphenylmethane dyes, xanthene dyes, and phthalein dyes are described in JP-B-51-452, JP-A-50-90334, JP-A-50-114227, JP-A-53-39130, JP-A-53-82353, U.S. Pat. Nos. 3,052,540 and 4,054,450, and JP-A-57-16456.

The polymethine dyes, such as oxonol dyes, merocyanine dyes, cyanine dyes, and rhodacyanine dyes, include those described in F. M. Harmmer, *The Cyanine Dyes and Related Compounds*. Specific examples are described in U.S. Pat. Nos. 3,047,384, 3,110,591, 3,121,008, 3,125,447, 3,128,179, 3,132,942, and 3,622,317, British Patents 1,226,892, 1,309,274 and 1,405,898, JP-B-48-7814 and JP-B-55-18892.

In addition, polymethine dyes capable of spectrally sensitizing in the longer wavelength region of 700 nm or more, i.e., from the near infrared region to the infrared region, include those described in JP-A-47-840, JP-A-47-44180, JP-B-51-41061, JP-A-49-5034, JP-A-49-45122, JP-A-57-46245, JP-A-56-35141, JP-A-57-157254, JP-A-61-26044, JP-A-61-27551, U.S. Pat. Nos. 3,619,154 and 4,175,956, and Research Disclosure, 216, pp. 117 and 118 (1982).

The photoreceptor of the present invention is particularly excellent in that the performance properties are not liable to variation even when combined with various kinds of sensitizing dyes.

If desired, the photoconductive layer may further contain various additives commonly employed in the electrophotographic photoconductive layer, such as chemical sensitizers. Examples of the additives include electron-accepting compounds (e.g., halogen, benzoquinone, chloranil, acid anhydrides, organic carboxylic acids) described in the above-cited *Imaging*, Vol. 1973, No. 8, p. 12; and polyarylalkane compounds, hindered phenol compounds, and p-phenylenediamine compounds described in Hiroshi Komon, et al., *Saikin no Kododen Zairyo to Kankotai no Kaihatsu Jitsuyoka*, Chapters 4 to 6, Nippon Kagaku Joho K.K. (1986).

The amount of these additives is not particularly critical and usually ranges from 0.0001 to 2.0 parts by weight per 100 parts by weight of the photoconductive substance.

The photoconductive layer of the photoreceptor suitably has a thickness of from 1 to 100 μm, particularly from 10 to 50 μm.

In cases where the photoconductive layer functions as a charge generating layer in a laminated photoreceptor composed of a charge generating layer and a charge transport layer, the thickness of the charge generating layer suitably ranges from 0.01 to 1 μm, particularly from 0.05 to 0.5 μm.

Charge transport materials in the above-described laminated photoreceptor include polyvinylcarbazole, oxazole dyes, pyrazoline dyes, and triphenylmethane dyes. The thickness of the charge transport layer ranges from 5 to 40 μm, preferably from 10 to 30 μm.

Resins to be used in the insulating layer or charge transport layer typically include thermoplastic and thermosetting resins, e.g., polystyrene resins, polyester resins, cellulose resins, polyether resins, vinyl chloride resins, vinyl acetate resins, vinyl chloride-vinyl acetate copolymer resins, polyacrylate resins, polyolefin resins, urethane resins, epoxy resins, melamine resins, and silicone resins.

The photoconductive layer according to the present invention can be provided on any known support. In general, a support for an electrophotographic photosensitive layer is preferably electrically conductive. Any of conventionally employed conductive supports may be utilized in this invention. Examples of usable conductive supports include a base, e.g., a metal sheet, paper, a plastic sheet, etc., having been rendered electrically conductive by, for example, impregnating with a low resistant substance; the above-described base with the back side thereof (opposite to the photosensitive layer side) being rendered conductive and having further coated thereon at least one layer for the purpose of prevention of curling; the aforesaid supports having provided thereon a water-resistant adhesive layer; the aforesaid supports having provided thereon at least one precoat layer; and paper laminated with a plastic film on which aluminum, etc., is deposited.

Specific examples of conductive supports and materials for imparting conductivity are described in Yukio Sakamoto, *Denshishashin*, Vol. 14, No. 1, pp. 2 to 11 (1975), Hiroyuki Moriga, *Nyumon Tokushushi no Kagaku*, Kobunshi Kankokai (1975), and M. F. Hoover, *J. Macromol. Sci. Chem.*, A-4(6), pp. 1327 to 1417 (1970).

The present invention will now be illustrated in greater detail by way of Synthesis Examples, Examples and Comparative Examples, but it should be understood that the present invention is not deemed to be limited thereto.

SYNTHESIS EXAMPLE 1

Synthesis of Resin (A-1)

A mixed solution of 95 g of 2,6-dichlorophenyl methacrylate, 5 g of acrylic acid, and 200 g of toluene was heated to 90° C. in a nitrogen stream, and 6 g of 2,2'-azobis(isobutyronitrile) was added thereto to effect polymerization for 8 hours. The resulting resin (designated as (A-1)) had a weight average molecular weight (hereinafter abbreviated as Mw) of 8,500 and a glass transition point (hereinafter abbreviated as Tg) of 60° C.

SYNTHESIS EXAMPLES 2 TO 21

Synthesis of Resins (A-2) to (A-21)

Resins (A) of Table 1 below were synthesized from the corresponding monomers under the same polymerization conditions as in Synthesis Example 1. These resins had an Mw between $8\times10^3$ to $9.5\times10^3$.

TABLE 1

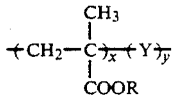

(x/y: weight ratio)

| Synthesis Example No. | Resin (A) | —R | x/y | —Y— |
|---|---|---|---|---|
| 2 | (A-2) | 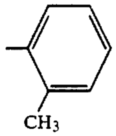 | 95/5 | 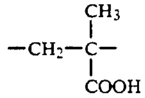 |
| 3 | (A-3) | 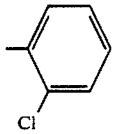 | 95/5 | " |
| 4 | (A-4) | 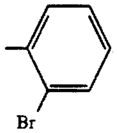 | 95/5 | " |
| 5 | (A-5) | 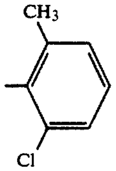 | 94/6 |  |
| 6 | (A-6) | 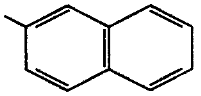 | 97/3 | 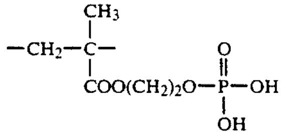 |

TABLE 1-continued
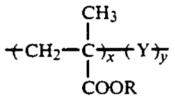
(x/y: weight ratio)
| Synthesis Example No. | Resin (A) | —R | x/y | —Y— |
|---|---|---|---|---|
| 7 | (A-7) | 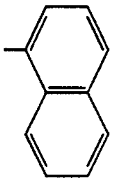 | 95/5 | 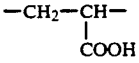 |
| 8 | (A-8) | 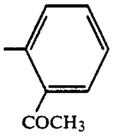 | 94/6 | 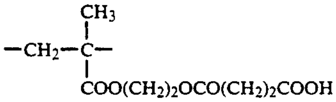 |
| 9 | (A-9) | 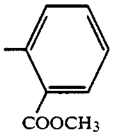 | 95/5 |  |
| 10 | (A-10) | 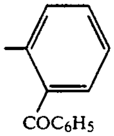 | 94/6 | 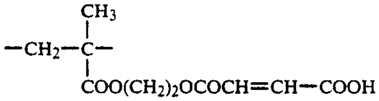 |
| 11 | (A-11) | 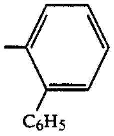 | 95/5 | 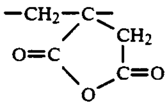 |
| 12 | (A-12) | 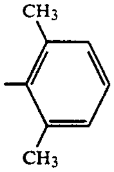 | 95/5 | 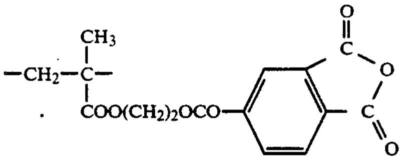 |
| 13 | (A-13) | 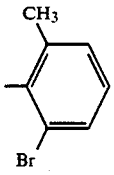 | 95/5 | 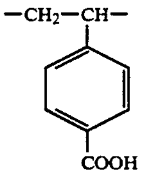 |
| 14 | (A-14) | 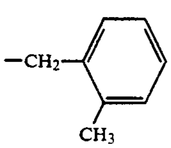 | 97/3 | 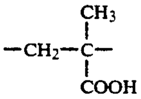 |

TABLE 1-continued

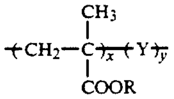

(x/y: weight ratio)

| Synthesis Example No. | Resin (A) | —R | x/y | —Y— |
|---|---|---|---|---|
| 15 | (A-15) | 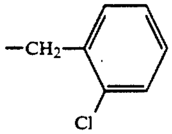 | 96/4 | 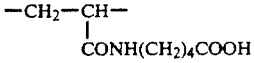 |
| 16 | (A-16) | 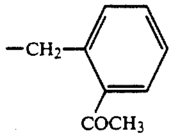 | 93/7 | 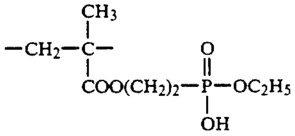 |
| 17 | (A-17) | 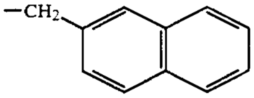 | 95/5 | 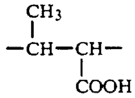 |
| 18 | (A-18) | 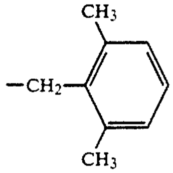 | 98/2 | 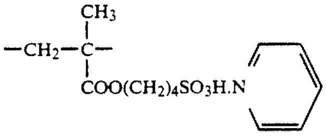 |
| 19 | (A-19) | 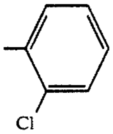 | 97.5/2.5 | 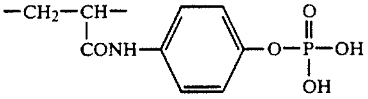 |
| 20 | (A-20) | " | 97/3 | 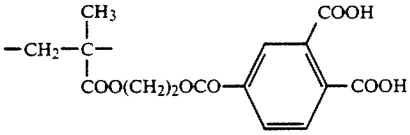 |
| 21 | (A-21) | 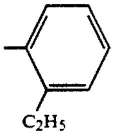 | 98/2 | 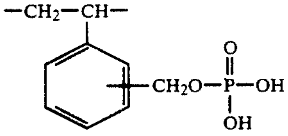 |

SYNTHESIS EXAMPLE 22

Synthesis of Resin (A-22)

A mixed solution of 85 g of 1-naphthyl methacrylate, 10 g of allyl methacrylate, 5 g of methacrylic acid, 2 g of n-dodecylmercaptan, and 250 g of toluene was heated to 70° C., and 1.0 g of 2,2'-azobis(isovaleronitrile) (hereinafter abbreviated as ABIV) was added thereto to effect reaction for 4 hours. To the reaction mixture was further added 0.5 g of ABIV, followed by reacting for 3 hours. After cooling, the reaction mixture was poured into 1.5 liters of methanol to reprecipitate, and the precipitated viscous substance was collected by decantation and dried under reduced pressure at room temperature to obtain 68 g of a copolymer (A-22) having the following composition and an Mw of $5.8\times10^3$.

(A-22):

-continued

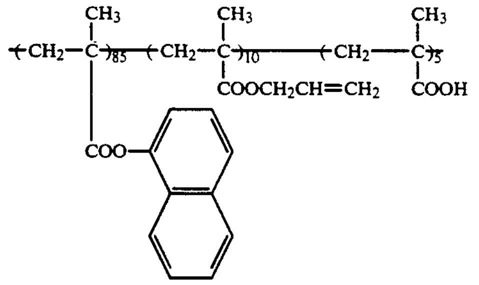

SYNTHESIS EXAMPLES 23 TO 28

Synthesis of Resin (A-23) to (A-28)

Resins (A) shown in Table 2 below were synthesized under the same polymerization conditions as in Synthesis Example 22. These resins had an Mw between $5\times10^3$ to $7\times10^3$.

TABLE 2

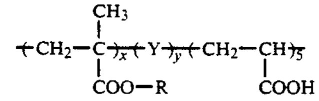

(x + y = 95 by weight)

| Synthesis Example No. | Resin (A) | —R | x/y | —Y— |
|---|---|---|---|---|
| 23 | (A-23) | 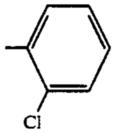 | 75/20 | 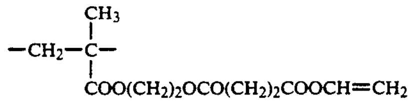 |
| 24 | (A-24) | 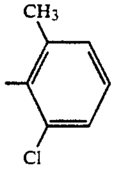 | 75/20 | 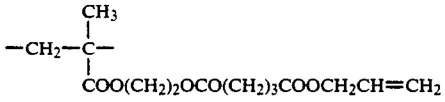 |
| 25 | (A-25) | " | 65/25 | 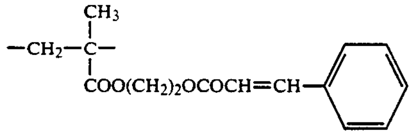 |
| 26 | (A-26) | 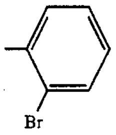 | 80/20 | 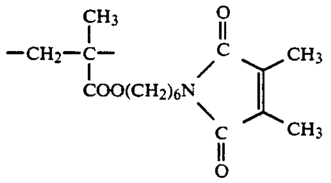 |
| 27 | (A-27) | 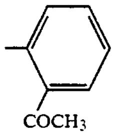 | 80/15 | 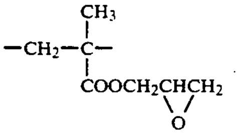 |
| 28 | (A-28) | 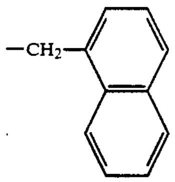 | 75/20 | 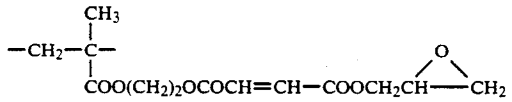 |

SYNTHESIS EXAMPLE 29

Synthesis of Resin (A-29)

A mixed solution of 90 g of 2-chloro-6-methylphenyl methacrylate, 10 g of methacrylic acid, and 200 g of toluene was allowed to react under the same polymerization conditions as in Synthesis Example 1. Then, 8 g of glycidyl methacrylate, 1.0 g of N,N-dimethyldodecylamine, and 1.0 g of t-butylhydroquinone were added thereto, followed by reacting at 100° C. for 10 hours. The methacrylic acid content in the polymer produced was determined by neutralization titration with a 0.1 N potassium hydroxide methanol solution.

When the reaction rate of methacrylic acid reached about 50%, the reaction was ceased. After cooling, the reaction mixture was poured into 1.5 liters of methanol, and the precipitated viscous substance was collected and dried under reduced pressure at room temperature to obtain 65 g of a copolymer (A-29) having the following composition and an Mw of $8.6\times10^3$.

(A-29):

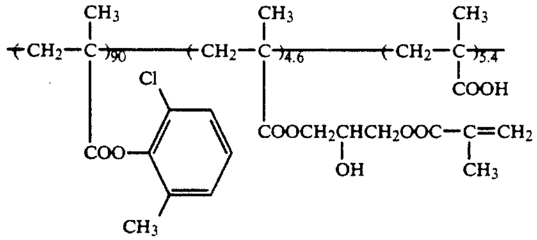

(weight copolymerization ratio)

SYNTHESIS EXAMPLES 30 TO 32

Synthesis of Resins (A-30) to (A-32)

Resins (A) of Table 3 were synthesized in the same manner as in Synthesis Example 29. The resulting resins had an Mw between $8\times10^3$ and $9.5\times10^3$.

TABLE 3

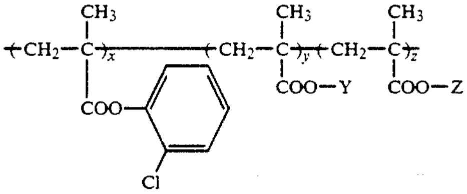

(x/y/z: by weight)

| Synthesis Example No. | Resin (A) | —Y | —Z | x/y/z |
|---|---|---|---|---|
| 30 | (A-30) | 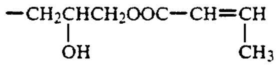 | —H | 90/6/4 |
| 31 | (A-31) | 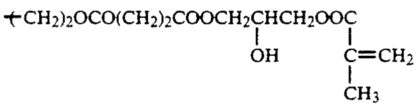 | $-(CH_2)_2OCO(CH_2)_2COOH$ | 86/8/6 |
| 32 | (A-32) | 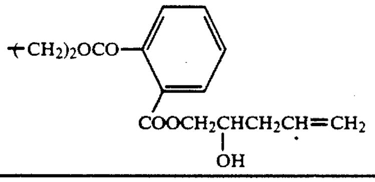 | 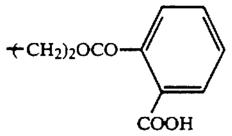 | 83/10/7 |

EXAMPLE 1

A mixture consisting of 6 g (solid basis) of (A-1) prepared in Synthesis Example 1, 34 g (solid basis) of polyethyl methacrylate (Mw: $3.6\times10^5$; hereinafter referred to as (B-1)), 200 g of zinc oxide, 0.018 g of a cyanine dye (A) shown below, 0.30 g of phthalic anhydride, and 300 g of toluene was dispersed in a ball mill for 3 hours to prepare a composition for forming a photoconductive layer. The resulting composition was coated on paper having been rendered conductive with a wire bar to a dry thickness of 22 g/m$^2$, followed by drying at 110° C. for 30 seconds. The coating was allowed to stand in a dark place at 20° C. and 65% RH (relative humidity) for 24 hours to prepare an electrophotographic photoreceptor.

Dye (A):

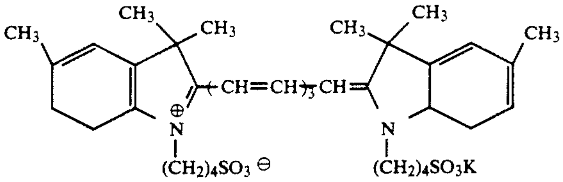

EXAMPLE 2

An electrophotographic photoreceptor was prepared in the same manner as in Example 1, except for replacing 34 g of (B-1) with 34 g of (B-2) shown below.

(B-2):

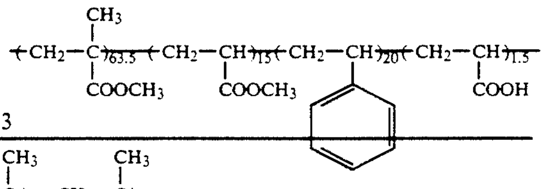

(weight copolymerization ratio)
Mw: $6.5\times10^4$

EXAMPLE 3

A mixture consisting of 6 g of (A-1), 32 g of (B-3) shown below, 200 g of zinc oxide, 0.018 g of cyanine dye (A), 0.30 g of phthalic anhydride, and 300 g of toluene was dispersed in a ball mill for 2 hours, and 2 g of 1,3-xylylene diisocyanate was added thereto, followed by dispersing in a ball mill for 10 minutes. The resulting composition was coated on paper having been rendered conductive with a wire bar to a dry thickness of 22 g/m$^2$, and dried at 100° C. for 15 seconds and then at 120° C. for 2 hours. Then, the coating was allowed to stand in a dark place at 20° C. and 65% RH for 24 hours to obtain an electrophotographic photoreceptor.

(B-3):

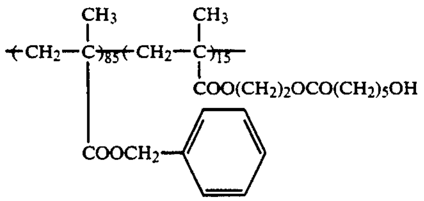

(weight copolymerization ratio)
Mw: 5.6 × 10$^4$

COMPARATIVE EXAMPLE A

An electrophotographic photoreceptor (designated as Sample A) was prepared in the same manner as in Example 1, except for replacing 6 g of (A-1) with 6 g of a resin (R-1) shown below.

(R-1):

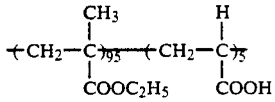

(weight copolymerization ratio)
Mw: 7.6 × 10$^3$

COMPARATIVE EXAMPLE B

An electrophotographic photoreceptor (Sample B) was prepared in the same manner as in Example 1, except for replacing (A-1) and (B-1) with 40 g of (B-2) as used in Example 2.

Each of the photoreceptors obtained in Examples 1 to 3 and Comparative Examples A to B was evaluated for film properties in terms of surface smoothness and mechanical strength; electrostatic characteristics; image forming performance; and stability of image forming performance against variation of environmental conditions in accordance with the following test methods. Further, an offset master plate was produced from each of the photoreceptors, and the oil desensitivity of the photoconductive layer in terms of contact angle with water after oil desensitization and printing durability were evaluated in accordance with the following test methods. The results obtained are shown in Table 4 below.

1) Smoothness of Photoconductive Layer:

The smoothness (sec/cc) was measured by means of a Beck's smoothness tester manufactured by Kumagaya Riko K.K. under an air volume condition of 1 cc.

2) Mechanical Strength of Photoconductive Layer:

The surface of the photoreceptor was repeatedly rubbed 1,000 times with emery paper (#1000) under a load of 50 g/cm$^2$ by the use of a Heidon 14 Model surface testing machine (manufactured by Shinto Kagaku K.K.). After dusting, the abrasion loss of the photoconductive layer was measured to obtain a film retention (%).

3) Electrostatic Characteristics:

The sample was charged by corona discharge to a voltage of −6kV for 20 seconds in a dark room at 20° C. and 65% RH using a paper analyzer ("Paper Analyzer SP-428" manufactured by Kawaguchi Denki K.K.). After the elapse of 10 seconds from the end of the corona discharge, the surface potential $V_{10}$ was measured. The standing of the sample in dark was further continued for an additional 120 seconds, and the potential $V_{130}$ was measured. The dark decay retention (DRR; %), i.e., percent retention of potential after dark decay for 120 seconds, was calculated from equation:

$$DRR\ (\%) = (V_{130}/V_{10}) \times 100$$

Separately, the sample was charged to −400 V by corona discharge and then exposed to light emitter from a gallium-aluminum-arsenic semiconductor laser (oscillation wavelength: 780 nm), and the time required for decay of the surface potential $V_{10}$ to one-tenth was measured to obtain an exposure $E_{1/10}$ (erg/cm$^2$).

The measurement was conducted under conditions of 20° C. and 65% RH (hereinafter referred to as Condition I) or 30° C. and 80% RH (hereinafter referred to as Condition II).

4) Image Forming Performance:

After the samples were allowed to stand for one day at 20° C. and 65% RH (Condition I) or at 30° C. and 80% RH (Condition II), each sample was charged to −6 kV and exposed to light emitted from a gallium-aluminum-arsenic semiconductor laser (oscillation wavelength: 780 nm; output 2.8 mW) at an exposure amount of 56 erg/cm$^2$ (on the surface of the photoconductive layer) at a pitch of 25 μm and a scanning speed of 280 m/sec. The electrostatic latent image was developed with a liquid developer ("ELP-T" produced by Fuji Photo Film Co., Ltd.), followed by fixing. The reproduced image was visually evaluated for fog and image quality.

5) Contact Angle with Water:

The sample was passed once through an etching processor using an oil-desensitizing solution ("ELP-E" produced by Fuji Photo Film Co., Ltd.) to render the surface of the photoconductive layer oil-desensitive. On the thus oil-desensitized surface was placed a drop of 2 μl of distilled water, and the contact angle formed between the surface and water was measured by a goniometer.

6) Printing Durability:

The sample was processed in the same manner as described in 4) above, and the surface of the photoconductive layer was subjected to oil desensitization under the same conditions as in 5) above. The resulting lithographic printing plate was mounted on an offset printing machine ("Oliver Model 52", manufactured by Sakurai Seisakusho K.K.), and printing was carried out on fine paper. The number of prints obtained until background stains on nonimage areas appeared or the quality of image areas was deteriorated was taken as printing durability. The larger the number of the prints, the higher the printing durability.

TABLE 4

| | Example | | | Comparative | |
|---|---|---|---|---|---|
| | 1 | 2 | 3 | Example A | Example B |
| Surface Smoothness (sec/cc) | 125 | 120 | 110 | 130 | 105 |

TABLE 4-continued

| | Example | | | Comparative | |
|---|---|---|---|---|---|
| | 1 | 2 | 3 | Example A | Example B |
| Film Strength (%) | 93 | 88 | 98 | 65 | 90 |
| $V_{10}$ (−V): | | | | | |
| Condition I | 585 | 580 | 570 | 520 | 545 |
| Condition II | 570 | 575 | 555 | 490 | 410 |
| DRR (%): | | | | | |
| Condition I | 86 | 87 | 85 | 85 | 76 |
| Condition II | 84 | 85 | 82 | 84 | 40 |
| $E_{1/10}$ (erg/cm$^2$): | | | | | |
| Condition I | 28 | 29 | 34 | 48 | 120 |
| Condition II | 27 | 27 | 36 | 54 | 200 or more |
| Image Forming Performance: | | | | | |
| Condition I | good | good | good | no good (scratch-off of letters or thin lines were observed) | poor |
| Condition II | good | good | good | no good to poor ($D_m$ decreased; disappearance of letters or thin lines occurred) | extremely poor (image was undistinguishable from background fog) |
| Contact Angle with Water (°) | 10 or less | 10 or less | 10 or less | 10 or less | 10–20 |
| Printing Durability | 9,000 | 8,000 | 10,000 or more | 500 | background stains were observed from the start of printing |

As can be seen from Table 4, each of the photoreceptors according to the present invention exhibited satisfactory surface smoothness and electrostatic characteristics. When it was used as an offset master plate precursor, the reproduced image was clear and free from background fog. These results seem to be attributed to sufficient adsorption of the binder resin onto the photoconductive substance and sufficient covering over the surface of the photoconductive particles with the binder resin. For the same reason, oil desensitization of the offset master plate precursor with an oil-desensitizing solution sufficiently proceeded to render nonimage areas sufficiently hydrophilic, as proved by such a small contact angle of 10° or less with water. On practical printing using the resulting master plate, no background stains were observed in the prints.

Further, the photoconductive layer of each of the photoreceptors of the present invention had a film strength of 88% or more and, when used as an offset master plate, provided more than 8,000 prints of clear image free from background stains.

These results indicate that the film strength can be markedly improved by the action of the resin (B) or a combination of the resin (B) and a crosslinking agent without impairing the effects of the resin (A).

Sample A, in which a low molecular copolymer resin comprising an alkyl methacrylate unit and an acidic group-containing unit was used, showed considerable improvements in electrostatic characteristics over Sample B, in which only the conventionally known binder resin was used, but was still behind the samples of the present invention in characteristics. Actually, when Sample A was exposed to light using a low output semiconductor laser at a decreased scanning speed, the reproduced image was proved insufficient in quality.

Printing was carried out using an offset master printing plate produced from Sample A or B. As a result, the plate of Sample A caused scratch-off or cut of thin lines or fine letters from about the 500th print due to the unsatisfactory reproduced image formed on the precursor. The plate of Sample B caused serious background stains from the very start of printing due to the so poor electrostatic characteristics.

From all these considerations, it is thus revealed that the electrophotographic photoreceptor satisfying both requirements of electrostatic characteristics and printing suitability cannot be obtained but with the binder resin according to the present invention.

EXAMPLES 4 TO 12

An electrophotographic photoreceptor was prepared in the same manner as in Example 1, except for replacing 6 g of (A-1) and 34 g of (B-1) with each of the resins (A) and (B) shown in Table 5, respectively, and replacing the cyanine dye (A) with 0.020 g of a cyanine dye (B) shown below.

Cyanine Dye (B):

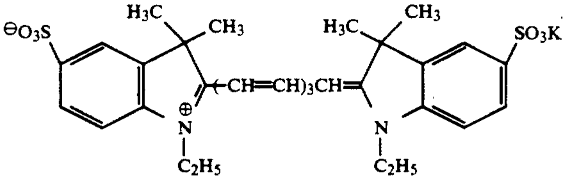

Various performance properties of the resulting photoreceptors were evaluated in the same manner as in Example 1, and the results of electrostatic characteristics determined under Condition II (30° C., 80% RH) are shown in Table 5.

TABLE 5

| Example No. | Resin (A) | Resin (B) | Mw of Resin (B) | Electrostatic Characteristics Condition II (30° C., 80% RH) $V_{10}$ (−V) | DRR (%) | $E_{1/10}$ (erg/cm²) |
|---|---|---|---|---|---|---|
| 4 | (A-2) | (B-4): polybutyl methacrylate | $3.5 \times 10^5$ | 550 | 85 | 30 |
| 5 | (A-3) | (B-5): styrene-ethyl methacrylate copolymer (15/85 by weight) | $1.5 \times 10^5$ | 570 | 86 | 26 |
| 6 | (A-4) | (B-6): polypropyl methacrylate | $2.5 \times 10^5$ | 565 | 85 | 25 |
| 7 | (A-5) | (B-7): ethyl methacrylate-acrylonitrile copolymer (80/20 by weight) | $1.8 \times 10^5$ | 570 | 87 | 26 |
| 8 | (A-6) | (B-8): polybenzyl methacrylate | $2.4 \times 10^5$ | 570 | 86 | 25 |
| 9 | (A-11) | (B-9): methyl methacrylate-methyl acrylate copolymer (90/10 by weight) | $1.8 \times 10^5$ | 545 | 83 | 30 |
| 10 | (A-13) | (B-10): ethyl methacrylate-2-cyanoethyl methacrylate copolymer (80/20 by weight) | $1.0 \times 10^5$ | 565 | 84 | 29 |
| 11 | (A-19) | (B-11): styrene-butyl methacrylate polymer (80/20 by weight) | $2.4 \times 10^5$ | 555 | 84 | 28 |
| 12 | (A-20) | (B-12): methyl methacrylate-ethyl methacrylate copolymer (40/60 by weight) | $3.0 \times 10^5$ | 560 | 86 | 27 |

As can be seen from Table 5, each of the photoreceptors according to the present invention was excellent in charging properties, dark decay retention, and photosensitivity and provided a clear reproduced image free from background fog or cut of thin lines even when processed under a severe condition of high temperature and high humidity (30° C., 80% RH). An offset master plate produced from the photoreceptor of the invention provided more than 8,000 prints having a clear image free from background stains.

EXAMPLES 13 TO 20

An electrophotographic photoreceptor was prepared in the same manner as in Example 3, except for replacing 6 g of (A-1) and 32 g of (B-3) with the respectively equal amount of each of the resins (A) and (B) shown in Table 6 and replacing 2 g of 1,3-xylylene diisocyanate (crosslinking agent) with the indicated amount of the compound shown in Table 6.

TABLE 6

| Example No. | Resin (A) | Resin (B) | Mw of Resin (B) | Crosslinking Agent Kind | Amount (g) |
|---|---|---|---|---|---|
| 13 | (A-33) | 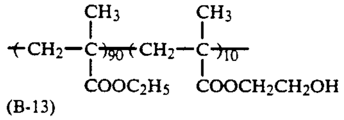 (B-13) | 38,000 | 1,3-xylylene diisocyanate | 1.5 |
| 14 | (A-34) | 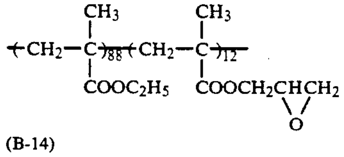 (B-14) | 40,000 | 1,6-hexamethylene-diamine | 1.3 |
| 15 | (A-18) | 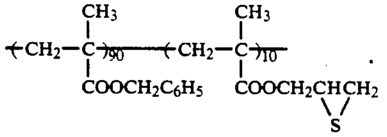 (B-15) | 41,000 | terephthalic acid | 1.5 |
| 16 | (A-11) | 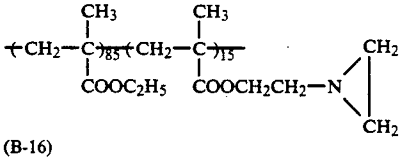 (B-16) | 38,000 | 1,4-tetramethylene-diamine | 1.2 |
| 17 | (A-12) | 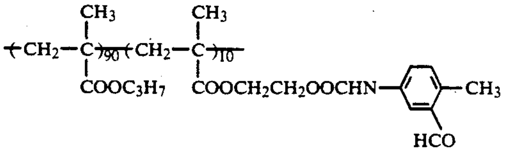 (B-17) | 37,000 | polyethylene glycol | 1.2 |

TABLE 6-continued

| Example No. | Resin (A) | Resin (B) | Mw of Resin (B) | Crosslinking Agent Kind | Amount (g) |
|---|---|---|---|---|---|
| 18 | (A-8) | " | " | polypropylene glycol | 1.2 |
| 19 | (A-13) | 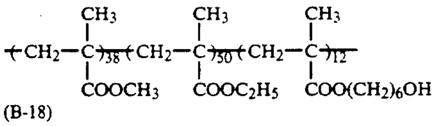 (B-18) | 42,000 | 1,6-hexamethylene diisocyanate | 2 |
| 20 | (A-22) | 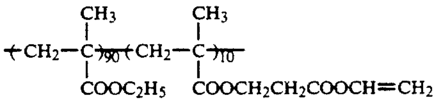 (B-19) | 55,000 | ethylene glycol dimethacrylate | 2 |

Each of the resulting photoreceptors was evaluated for electrostatic characteristics and printing properties in the same manner as in Example 1. As a result, the photoreceptors of the present invention were proved to be excellent in charging properties, dark decay retention, and photosensitivity and provided a clear reproduced image free from background fog or cut of thin lines even when processed under a severe condition of high temperature and high humidity (30° C., 80% RH). When they were used as an offset master plate precursor, the resulting printing plates provided more than 10,000 prints having a clear image free from background stains on the nonimage areas.

EXAMPLES 21 TO 24

A mixture consisting of 6.5 g each of resins (A) shown in Table 7, 20 g each of resins (B) of Group X shown in Table 7, 200 g of zinc oxide, 0.018 g of a methine dye (C) shown below, 0.35 g of maleic anhydride, and 300 g of toluene was dispersed in a ball mill for 3 hours. To the dispersion was added 13.5 g each of resins (B) of Group Y, followed by further dispersing in a ball mill for 10 minutes. The resulting photoconductive composition was coated on paper having been rendered conductive with a wire bar to a dry thickness of 20 $g/m^2$ and heated at 100° C. for 15 seconds and then at 120° C. for 2 hours. Then, the resulting coated material was allowed to stand at 20° C. and 65% RH for 24 hours to obtain an electrophotographic photoreceptor.

Methine Dye (C):

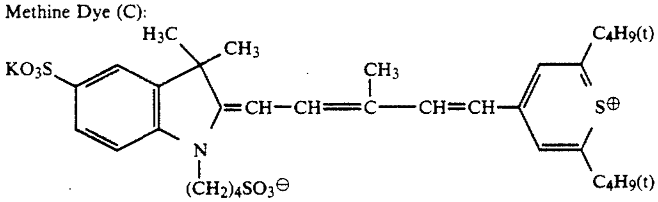

TABLE 7

| Example No. | Resin (A) | Resin (B) —X Group | Resin (B) —Y Group |
|---|---|---|---|
| 21 | (A-34) | 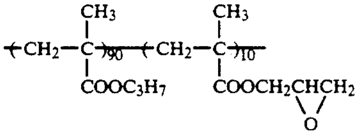 (B-20) (Mw: 42,000) | 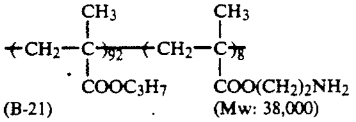 (B-21) (Mw: 38,000) |
| 22 | (A-12) | 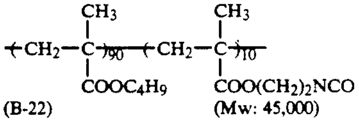 (B-22) (Mw: 45,000) | (B-21) |
| 23 | (A-19) | 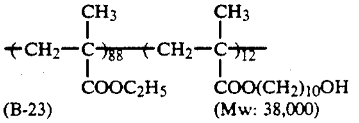 (B-23) (Mw: 38,000) | 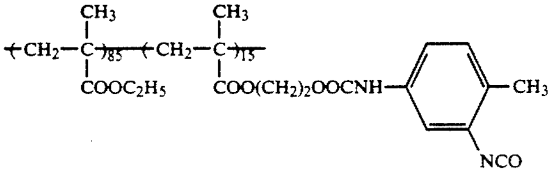 (B-24) (Mw: 46,000) |

TABLE 7-continued

| Example No. | Resin (A) | Resin (B) —X Group | Resin (B) —Y Group |
|---|---|---|---|
| 24 | (A-10) | (B-21) | 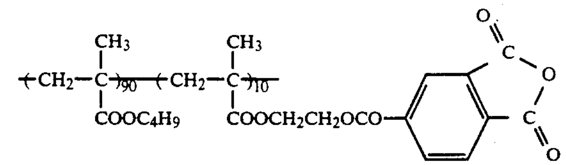 (B-25) (Mw: 33,000) |

As a result of evaluations in the same manner as in Example 1, each of the photoreceptors according to the present invention was proved excellent in charging properties, dark charge retention, and photosensitivity, and provided a clear reproduced image free from background fog even when processed under a severe condition of high temperature and high humidity (30° C., 80% RH).

When an offset printing plate produced from each of the photoreceptors of the invention was used for printing, 10,000 prints of clear image could be obtained.

EXAMPLE 25

A mixture consisting of 7 g of (A-33), 18 g of (B-15), 200 g of zinc oxide, 0.50 g of Rose Bengale, 0.25 g of Tetrabromophenol Blue, 0.30 g of uranine, 0.30 g of tetrahydrophthalic anhydride, and 240 g of toluene was dispersed in a ball mill for 2 hours. To the dispersion was further added 15 g of resin (B-26) shown below, followed by dispersing for 10 minutes. The resulting photosensitive composition was coated on paper having been rendered conductive with a wire bar to a dry thickness of 20 $g/m^2$, followed by drying by heating at 110° C. for 30 seconds and then at 120° C. for 2 hours. The coating was allowed to stand in a dark place at 20° C. and 65% RH for 24 hours to prepare an electrophotographic photoreceptor.

Resin (B-26):

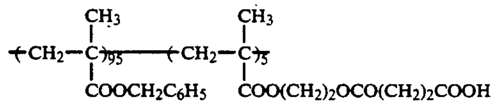

(weight copolymerization ratio)
Mw: $3.0 \times 10^4$

The resulting photoreceptor was evaluated in the same manner as in Example 1 with the following exceptions. In the evaluation of electrostatic characteristics, DRR (%) was calculated from formula ($V_{70}/V_{10} \times 100$), wherein $V_{10}$ and $V_{70}$ are surface potentials determined after 10 seconds' standing and 70 seconds' standing from the end of corona discharge, respectively. Photosensitivity ($E_{1/10}$ (lux·sec)) was determined by using visible light (2.0 lux) for exposure. In the evaluation of image forming performance, the sample as a printing plate precursor was processed to form a toner image by means of an automatic plate making machine "ELP 404V" (manufactured by Fuji Photo Film Co., Ltd.) using "ELP-T" (produced by Fuji Photo Film Co., Ltd.) as a toner.

The results obtained were as follows.

Surface Smoothness: 110 cc/sec

Film Strength: 92%

| | Electrostatic Characteristics: | | |
|---|---|---|---|
| | $V_{10}$ (V) | DRR (%) | $E_{1/10}$ (lux · sec) |
| Condition I (20° C., 65% RH) | −555 | 90 | 10.8 |
| Condition II (30° C., 80% RH) | −545 | 88 | 11.0 |

Image Forming Performance:

A satisfactory reproduced image was formed either under Condition I or under Condition II.

Printing Durability:

10,000 prints having satisfactory image quality could be obtained.

It can thus be seen that the photoreceptor according to the present invention exhibits excellent electrophotographic characteristics and high printing durability.

EXAMPLES 26 AND 27

A mixture consisting of 6 g of (A-31), 6 g of (A-32), 34 g each of resins (B) shown in Table 8, 200 g of zinc oxide, 0.02 g of uranine, 0.04 g of Rose Bengale, 0.03 g of Bromophenol Blue, 0.40 g of phthalic anhydride, and 300 g of toluene was dispersed in a ball mill for 2 hours to prepare a composition for forming a photoconductive layer. The composition was coated on paper having been rendered conductive with a wire bar to a dry thickness of 20 $g/m^2$ and dried at 110° C. for 1 minute. The thus formed photoconductive layer was exposed to light emitted from a high pressure mercury lamp for 3 minutes over the entire surface thereof and then allowed to stand in a dark place at 20° C. and 65% RH for 24 hours to prepare an electrophotographic photoreceptor. The characteristics of the resulting photoreceptors are shown in Table 9.

TABLE 8

| Example No. | Resin (A) | Resin (B) |
|---|---|---|
| 26 | (A-31) | (B-27): 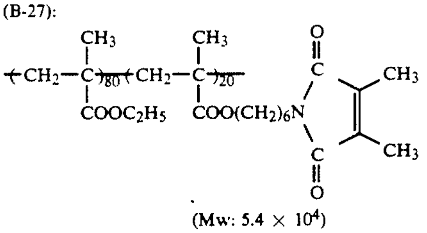 (Mw: 5.4 × $10^4$) |
| 27 | (A-32) | (B-28): 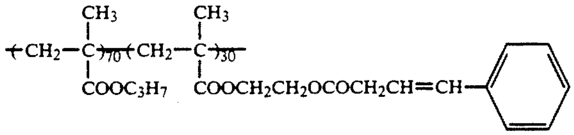 (Mw: 6.0 × $10^4$) |

TABLE 9

| Example No. | Surface Smoothness (cc/sec) | Film Strength (%) | $V_{10}$ (−V) | DRR (%) | $E_{1/10}$ (lux · sec) | Printing Durability |
|---|---|---|---|---|---|---|
| 26 | 125 | 95 | 550 | 83 | 11.9 | 9,000 |
| 27 | 130 | 93 | 550 | 82 | 12.3 | 8,500 |

As is shown in Table 9, the photoreceptors according to the present invention were excellent in charging properties, dark decay retention and photosensitivity and provided a clear reproduced image free from background fog even when processed under a severe condition of high temperature and high humidity (30° C., 80% RH). When they were used as an offset master plate precursor, the resulting master plate provided 8,500 to 9,000 prints of clear image.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising a support having provided thereon at least one photoconductive layer containing at least inorganic photoconductive particles and a binder resin, wherein said binder resin comprises at least one resin (A) having a weight average molecular weight of from $1\times10^3$ to $2\times10^4$ and comprising not less than 30% by weight of at least one repeating unit (a-i) represented by formula (I) or (II):

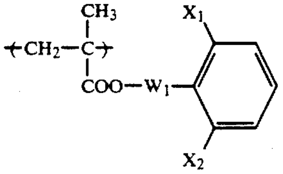

(I)

-continued

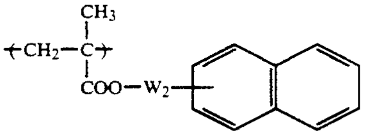

(II)

wherein $X_1$ and $X_2$ each represents a hydrogen atom, a hydrocarbon group having from 1 to 10 carbon atoms, a chlorine atom, a bromine atom, —$COY_1$ or —$COOY_2$, wherein $Y_1$ and $Y_2$ each represents a hydrocarbon group having from 1 to 10 carbon atoms, provided that both $X_1$ and $X_2$ do not simultaneously represent a hydrogen atom; and $W_1$ and $W_2$ each represents a mere bond or a linking group containing from 1 to 4 linking atoms which connects —COO— and the benzene ring, and from 0.5 to 15% by weight of at least one repeating unit (a-ii) containing at least one acidic group selected from —$PO_3H_2$, —$SO_3H$, —COOH,

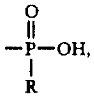

wherein R represents a hydrocarbon group or —OR′ wherein R′ represents a hydrocarbon group having from 1 to 22 carbon atoms, and a cyclic acid anhydride-containing group.

2. An electrophotographic photoreceptor as claimed in claim 1, wherein the proportion of said repeating unit (a-i) in the resin (A) is from 50 to 97% by weight and that of said repeating unit (a-ii) is from 3 to 10% by weight.

3. An electrophotographic photoreceptor as claimed in claim 1, wherein said resin (A) has a weight average molecular weight of from $3\times10^3$ to $1\times10^4$.

4. An electrophotographic photoreceptor as claimed in claim 1, wherein said resin (A) further comprises from 1 to 30% by weight of at least one repeating unit (a-iii) containing at least one heat- and/or photocurable functional group.

5. An electrophotographic photoreceptor as claimed in claim 4, wherein said photoconductive layer further contains a crosslinking agent which accelerates heat- and/or photocuring reaction.

6. An electrophotographic photoreceptor as claimed in claim 1, wherein said binder resin further comprises at least one resin (B) having a weight average molecular weight of from $2\times10^4$ to $6\times10^5$.

7. An electrophotographic photoreceptor as claimed in claim 6, wherein said resin (B) contains at least 30% by weight of a repeating unit represented by formula (III):

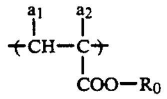

(III)

wherein $a_1$ and $a_2$, which may be the same or different, each represents a hydrogen atom, a halogen atom, a cyano group, or a hydrocarbon group; and $R_0$ represents a hydrocarbon group.

8. An electrophotographic photoreceptor as claimed in claim 7, wherein said resin (B) further contains from 0.05 to 5% by weight of repeating unit (a-ii) and has a weight average molecular weight of from $2\times10^4$ to $1\times10^5$.

9. An electrophotographic photoreceptor as claimed in claim 6, wherein said resin (B) contains from 1 to 30% by weight of at least one repeating unit containing a heat- and/or photocurable functional group and has a weight average molecular weight of from $2\times10^4$ to $1\times10^5$.

10. An electrophotographic photoreceptor as claimed in claim 9, wherein said photoconductive layer further contains a crosslinking agent which accelerates heat- and/or photocuring reaction.

11. An electrophotographic photoreceptor as claimed in claim 1, wherein said photoconductive layer further contains a crosslinking agent which accelerates heat- and/or photocuring reaction.

12. An electrophotographic photoreceptor as claimed in claim 1, wherein said inorganic photoconductive particles are zinc oxide particles.

* * * * *